(12) United States Patent
Zorgui et al.

(10) Patent No.: US 12,276,751 B2
(45) Date of Patent: Apr. 15, 2025

(54) WAVEFORM REPORTING FOR COOPERATIVE SENSING

(71) Applicant: QUALCOMM Incorporated, San Diego, CA (US)

(72) Inventors: Marwen Zorgui, San Diego, CA (US); Srinivas Yerramalli, San Diego, CA (US); Rajat Prakash, San Diego, CA (US); Xiaoxia Zhang, San Diego, CA (US); Roohollah Amiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 17/485,076

(22) Filed: Sep. 24, 2021

(65) Prior Publication Data

US 2022/0099796 A1 Mar. 31, 2022

Related U.S. Application Data

(60) Provisional application No. 63/085,049, filed on Sep. 29, 2020.

(51) Int. Cl.
*G01S 7/35* (2006.01)
*G01S 13/58* (2006.01)
*G01S 13/89* (2006.01)

(52) U.S. Cl.
CPC .............. *G01S 7/354* (2013.01); *G01S 7/356* (2021.05); *G01S 13/584* (2013.01); *G01S 13/89* (2013.01)

(58) Field of Classification Search
CPC ........ G01S 7/354; G01S 7/356; G01S 13/584; G01S 13/89
See application file for complete search history.

(56) References Cited

U.S. PATENT DOCUMENTS

| 7,688,747 | B2 * | 3/2010 | Zumsteg | ............... | H04W 64/00 370/312 |
| 2007/0133462 | A1 * | 6/2007 | Guey | ..................... | H04L 5/0048 370/208 |
| 2014/0313070 | A1 * | 10/2014 | Asanuma | ................... | G01S 7/41 342/200 |
| 2017/0054449 | A1 * | 2/2017 | Mani | ....................... | G01S 7/295 |
| 2018/0220381 | A1 * | 8/2018 | Hudson | ............... | H04W 52/283 |
| 2019/0342874 | A1 * | 11/2019 | Davydov | .............. | H04W 72/23 |
| 2019/0357066 | A1 | 11/2019 | Kim et al. | | |
| 2020/0033849 | A1 | 1/2020 | Yiu et al. | | |
| 2020/0217925 | A1 * | 7/2020 | Kim | ........................ | G01S 13/53 |

(Continued)

OTHER PUBLICATIONS

International Search Report and Written Opinion—PCT/US2021/052140—ISA/EPO—Feb. 1, 2022 (208364WO).

*Primary Examiner* — Bernarr E Gregory
*Assistant Examiner* — Hailey R Le
(74) *Attorney, Agent, or Firm* — Holland & Hart LLP

(57) ABSTRACT

Methods, systems, and devices for wireless communications are described. The method may include receiving, from a network node, a configuration for radar waveform reporting, the radar waveform reporting providing object detection for one or more objects within a detectable range, receiving a radar waveform, and transmitting, to the network node according to the received configuration, a radar reporting message including an indication of one or more parameter values associated with the received radar waveform.

30 Claims, 20 Drawing Sheets

(56) References Cited

U.S. PATENT DOCUMENTS

| | | | | |
|---|---|---|---|---|
| 2021/0011147 A1* | 1/2021 | Va | ............................ | G01S 7/415 |
| 2021/0209453 A1* | 7/2021 | Meissner | .................. | G06N 3/04 |
| 2021/0286045 A1* | 9/2021 | Bayesteh | .............. | H04B 7/0695 |
| 2022/0163651 A1* | 5/2022 | Bengtsson | ............... | G01S 13/48 |
| 2023/0038486 A1* | 2/2023 | Worman | ................. | G06Q 10/06 |

* cited by examiner

WAVEFORM REPORTING FOR COOPERATIVE SENSING

CROSS REFERENCE

The present application for patent claims the benefit of U.S. Provisional Patent Application No. 63/085,049 by ZORGUI et al., entitled "WAVEFORM REPORTING FOR COOPERATIVE SENSING," filed Sep. 29, 2020, assigned to the assignee hereof, and expressly incorporated by reference herein.

FIELD OF TECHNOLOGY

The following relates to wireless communications, including waveform reporting for cooperative sensing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a network device (e.g., a UE, a base station) may utilize radar signaling for ranging and other applications.

SUMMARY

The described techniques relate to improved methods, systems, devices, and apparatuses that support waveform reporting for cooperative sensing. Generally, the described techniques provide for a user equipment (UE) receiving a configuration for radar waveform reporting from a network node. In some cases, the radar waveform reporting may provide object detection for one or more objects within a detectable range of the UE. In some examples, the UE may receive a radar waveform (e.g., a radar waveform reflected off an object of the one or more objects). In some examples, the UE may transmit a radar reporting message to the network node according to the received configuration. In some cases, the radar reporting message may include an indication of the received radar waveform.

A method of wireless communication a UE is described. The method may include receiving, from a network node, a configuration for radar waveform reporting, the radar waveform reporting for object detection for one or more objects within a detectable range of the UE, receiving a radar waveform, and transmitting, to the network node according to the received configuration, a radar reporting message including an indication of one or more parameter values associated with the received radar waveform.

An apparatus for wireless communication a UE is described. The apparatus may include a processor, memory coupled with the processor, and instructions stored in the memory. The instructions may be executable by the processor to cause the apparatus to receive, from a network node, a configuration for radar waveform reporting, the radar waveform reporting for object detection for one or more objects within a detectable range of the UE, receive a radar waveform, and transmit, to the network node according to the received configuration, a radar reporting message including an indication of one or more parameter values associated with the received radar waveform.

Another apparatus for wireless communication a UE is described. The apparatus may include means for receiving, from a network node, a configuration for radar waveform reporting, the radar waveform reporting for object detection for one or more objects within a detectable range of the UE, receiving a radar waveform, and transmitting, to the network node according to the received configuration, a radar reporting message including an indication of one or more parameter values associated with the received radar waveform.

A non-transitory computer-readable medium storing code for wireless communication a UE is described. The code may include instructions executable by a processor to receive, from a network node, a configuration for radar waveform reporting, the radar waveform reporting for object detection for one or more objects within a detectable range of the UE, receive a radar waveform, and transmit, to the network node according to the received configuration, a radar reporting message including an indication of one or more parameter values associated with the received radar waveform.

Some examples of the method, apparatuses, and non-transitory computer-readable medium described herein may further include operations, features, means, or instructions for determining the one or more parameter values based on receiving the radar waveform, and generating a map that maps at least a first parameter value of the one or more parameter values to a second parameter value of the one or more parameter values, where the indication of the one or more parameter values associated with the received radar waveform includes the generated map.

In some examples of the method, apparatuses, and non-transitory computer-readable medium described herein, the one or more parameter values include Doppler information, incident angle information, angular velocity information, or range information, or a combination thereof, for at least one of the one or more objects.

In some examples of the method, apparatuses, and non-transitory computer-readable medium described herein, generating the map may include operations, features, means, or instructions for performing a row-wise operation on a first grid that includes subcarrier rows and symbol columns to compute values for Doppler columns, and performing a column-wise operation on a second grid that includes the subcarrier rows and the computed Doppler columns to compute range row values for the map, where the first parameter value includes the range information and the second parameter value includes the Doppler information, and the map includes a range-Doppler map.

In some examples of the method, apparatuses, and non-transitory computer-readable medium described herein, generating the velocity-range map may include operations, features, means, or instructions for performing a row-wise operation on a first grid that includes chirp rows and sample columns to compute values for range columns, and performing a column-wise operation on a second grid that includes the chirp rows and the computed range columns to compute velocity row values for the map, where the first parameter value includes the velocity information and the second parameter value includes the range information, and the map includes a velocity-range map.

In some examples of the method, apparatuses, and non-transitory computer-readable medium described herein, generating the map may include operations, features, means, or instructions for generating, based at least in part on the configuration for radar waveform reporting, an antenna-specific map for each antenna of multiple antennas of the UE that receives the radar waveform. In some examples of the method, apparatuses, and non-transitory computer-readable medium described herein, generating, based at least in part on the configuration for radar waveform reporting, an antenna-aggregate map for one or more antennas of the UE that receives the radar waveform.

Some examples of the method, apparatuses, and non-transitory computer-readable medium described herein may further include operations, features, means, or instructions for mapping the received radar waveform to a compressed representation of the received radar waveform, where the indication of the one or more parameter values associated with the received radar waveform includes the compressed representation of the received radar waveform.

In some examples of the method, apparatuses, and non-transitory computer-readable medium described herein, the compressed representation of the received radar waveform may be determined based on a compression algorithm, or a trained model based on machine learning, or an auto-encoder based channel representation, or a generative adversarial networks based channel representation, or any combination thereof, as configured by the configuration for radar waveform reporting.

In some examples of the method, apparatuses, and non-transitory computer-readable medium described herein, the one or more parameter values associated with the received radar waveform include one or more time-domain samples of the received radar waveform obtained by the UE at a configured sampling rate.

In some examples of the method, apparatuses, and non-transitory computer-readable medium described herein, the one or more parameter values associated with the received radar waveform include one or more frequency-domain samples of the received radar waveform obtained by the UE at a configured sampling rate.

In some examples of the method, apparatuses, and non-transitory computer-readable medium described herein, the one or more frequency-domain samples include each symbol and tone of the received radar waveform.

In some examples of the method, apparatuses, and non-transitory computer-readable medium described herein, receiving the radar waveform may include operations, features, means, or instructions for receiving a reflected transmission of the radar waveform when the UE transmits the radar waveform, or receiving the reflected transmission of the radar waveform and receiving a direct transmission of the radar waveform when another UE, the network node, or a second network node transmits the radar waveform.

Some examples of the method, apparatuses, and non-transitory computer-readable medium described herein may further include operations, features, means, or instructions for performing synchronization with the network node, and determining a start time for transmission of the radar waveform based on the performed synchronization.

Some examples of the method, apparatuses, and non-transitory computer-readable medium described herein may further include operations, features, means, or instructions for determining a direct time of flight of the direct transmission of the radar waveform based on the determined start time and a direct arrival time of the direct transmission; or, determining a reflected time of flight of the reflected transmission of the radar waveform based on the determined start time and a reflected arrival time of the reflected transmission; or, determining a differential time of flight based on a difference of the reflected arrival time of the reflected transmission and the direct arrival time of the direct transmission; or determining a combination thereof.

In some examples of the method, apparatuses, and non-transitory computer-readable medium described herein, the configuration for radar waveform reporting includes one or more fast Fourier transform dimensions and configures the UE to report parameters that satisfy a configured parameter criteria, and where the one or more parameter values associated with the received radar waveform include the parameters.

In some examples of the method, apparatuses, and non-transitory computer-readable medium described herein, the radar waveform includes an orthogonal frequency-division multiplexing waveform, or a discrete Fourier transform spreading waveform, or a single carrier waveform, or a frequency-modulated continuous-wave waveform, or any combination thereof.

A method of wireless communication at a network node is described. The method may include transmitting, to a UE, a configuration for radar waveform reporting, receiving, from the UE according to the transmitted configuration, an indication of one or more parameter values associated with a radar waveform received at the UE, and determining location information for one or more objects based on the received indication of the one or more parameter values associated with the received radar waveform.

An apparatus for wireless communication at a network node is described. The apparatus may include a processor, memory coupled with the processor, and instructions stored in the memory. The instructions may be executable by the processor to cause the apparatus to transmit, to a UE, a configuration for radar waveform reporting, receive, from the UE according to the transmitted configuration, an indication of one or more parameter values associated with a radar waveform received at the UE, and determine location information for one or more objects based on the received indication of the one or more parameter values associated with the received radar waveform.

Another apparatus for wireless communication at a network node is described. The apparatus may include means for transmitting, to a UE, a configuration for radar waveform reporting, receiving, from the UE according to the transmitted configuration, an indication of one or more parameter values associated with a radar waveform received at the UE, and determining location information for one or more objects based on the received indication of the one or more parameter values associated with the received radar waveform.

A non-transitory computer-readable medium storing code for wireless communication at a network node is described. The code may include instructions executable by a processor to transmit, to a UE, a configuration for radar waveform reporting, receive, from the UE according to the transmitted configuration, an indication of one or more parameter values associated with a radar waveform received at the UE, and determine location information for one or more objects based on the received indication of the one or more parameter values associated with the received radar waveform.

Some examples of the method, apparatuses, and non-transitory computer-readable medium described herein may further include operations, features, means, or instructions for generating a map based on the one or more parameter values indicated by the received indication, where the map includes an angle-angular velocity map and the one or more parameter values include incident angle information and angular velocity information; or, the map includes a velocity-range map and the one or more parameter values include velocity information and the range information; or, any combination thereof. Some examples of the method, apparatuses, and non-transitory computer-readable medium described herein may further include operations, features, means, or instructions for determining the location information of at least one of the one or more objects based on the generated map.

In some examples of the method, apparatuses, and non-transitory computer-readable medium described herein, the one or more parameter values associated with the received radar waveform include chirp information, or range information of at least one of the one or more objects, or Doppler information of at least one of the one or more objects, or velocity information of at least one of the one or more objects, or incident angle information of the received radar waveform based on multiple antennas of the UE receiving the radar waveform, or any combination thereof.

In some examples of the method, apparatuses, and non-transitory computer-readable medium described herein, the received indication of the one or more parameter values associated with the received radar waveform includes a compressed representation of the received radar waveform.

Some examples of the method, apparatuses, and non-transitory computer-readable medium described herein may further include operations, features, means, or instructions for decompressing the compressed representation of the received radar waveform may be determined based on a decompression algorithm, or a trained model based on machine learning, or an auto-encoder based channel representation, or a generative adversarial networks based channel representation, or any combination thereof.

In some examples of the method, apparatuses, and non-transitory computer-readable medium described herein, the network node includes a sensing management function or may be a base station that includes the sensing management function.

DETAILED DESCRIPTION

Figure 1:
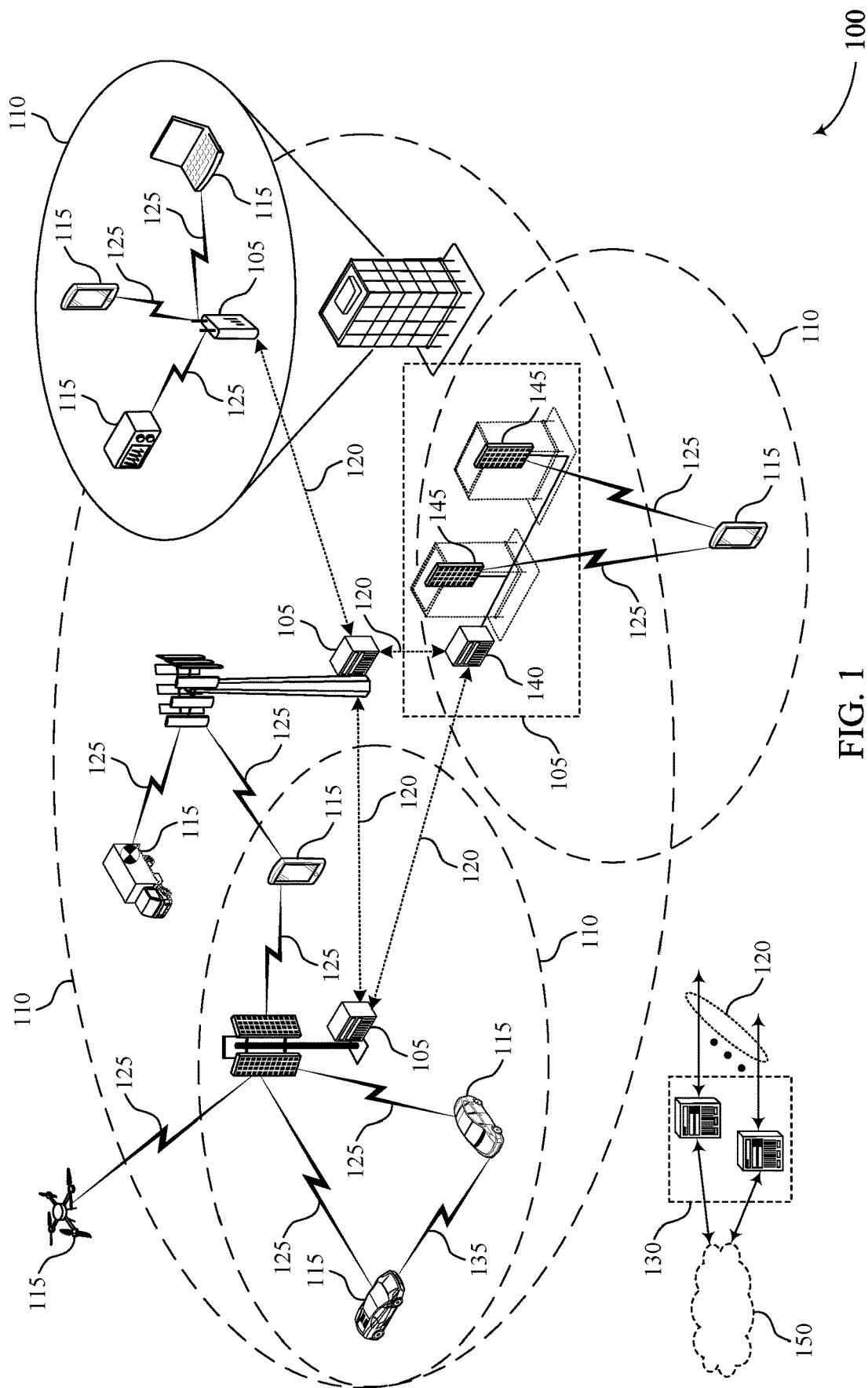
FIG. 1 illustrates an example of a wireless communications system that supports waveform reporting for cooperative sensing in accordance with aspects of the present disclosure.

Wireless devices (user equipment (UE), base stations) may use radar to identify objects, determine object direction/velocity, track objects, etc. Using radar, the wireless device may transmit a waveform and monitor for reflections of the waveform (for example, a commonly used waveform for radar systems is frequency modulated continuous wave (FMCW)). Each transmitted waveform may be transmitted in chirps that sweep in frequency over time. The same chirps may reflect off one or more objects and be received back at a receiver of the wireless device after a time delay. The delay may be proportional to a range between the wireless device and a detected object. The network node may identify a frequency difference between the transmitted chirps and the received chirps, and identify a range value based thereon. For example, the wireless device may receive the chirps and isolate a beat frequency. The location of the beat frequency may be used to identify the location of an object. However, detecting and tracking objects may be computationally expensive and may consume limited system resources for some wireless devices (e.g., battery-operated UE, etc.).

In some examples, the present techniques may include offloading all or portions of object detection and tracking from a receiver device (e.g., a wireless device, such as a UE, that receives/detects a radar waveform) to a network node (e.g., a dedicated network node) configured for detection and tracking of objects. In some cases, the dedicated network node may include a sensing management function (SMF). The receiver device may receive a configuration for radar waveform reporting from the dedicated network node. The radar waveform reporting provides object detection for objects within a detectable range of the UE. The receiver device may receive a radar waveform. In some cases, the receiver device may also be the transmitter of the radar waveform. In other cases, the dedicated network node may transmit the radar waveform, or a second wireless device (e.g., a second UE, a base station, etc.) may be the transmitter of the radar waveform. Thus, receiving the radar waveform includes receiving a reflected transmission of the radar waveform when the receiver device transmits the radar waveform, or receiving the reflected transmission of the radar waveform and receiving a direct transmission of the radar waveform when the dedicated network node or the second network node transmits the radar waveform. The receiver device may then transmit, according to the received configuration, an indication of one or more parameter values associated with the received radar waveform to the network node. The dedicated network node may receive such indications of received radar waveforms from multiple receiver devices and track multiple objects based on the received indications.

The present techniques improve operations of receiver devices by offloading all or portions of object detection and tracking to the dedicated network node, freeing up system resources of the receiver devices (e.g., conserving battery power, processing cycles, memory usage, storage usage), and improving user experience based on the improved battery life and improved system availability and quality of service.

Aspects of the disclosure are initially described in the context of wireless communications systems. Aspects of the disclosure are further illustrated by and described with reference to environments for waveform reporting, system diagrams, and antenna arrays. Aspects of the disclosure are further illustrated by and described with reference to apparatus diagrams, system diagrams, and flowcharts that relate to waveform reporting for cooperative sensing.

FIG. 1 illustrates an example of a wireless communications system 100 that supports waveform reporting for cooperative sensing in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Figure 2:
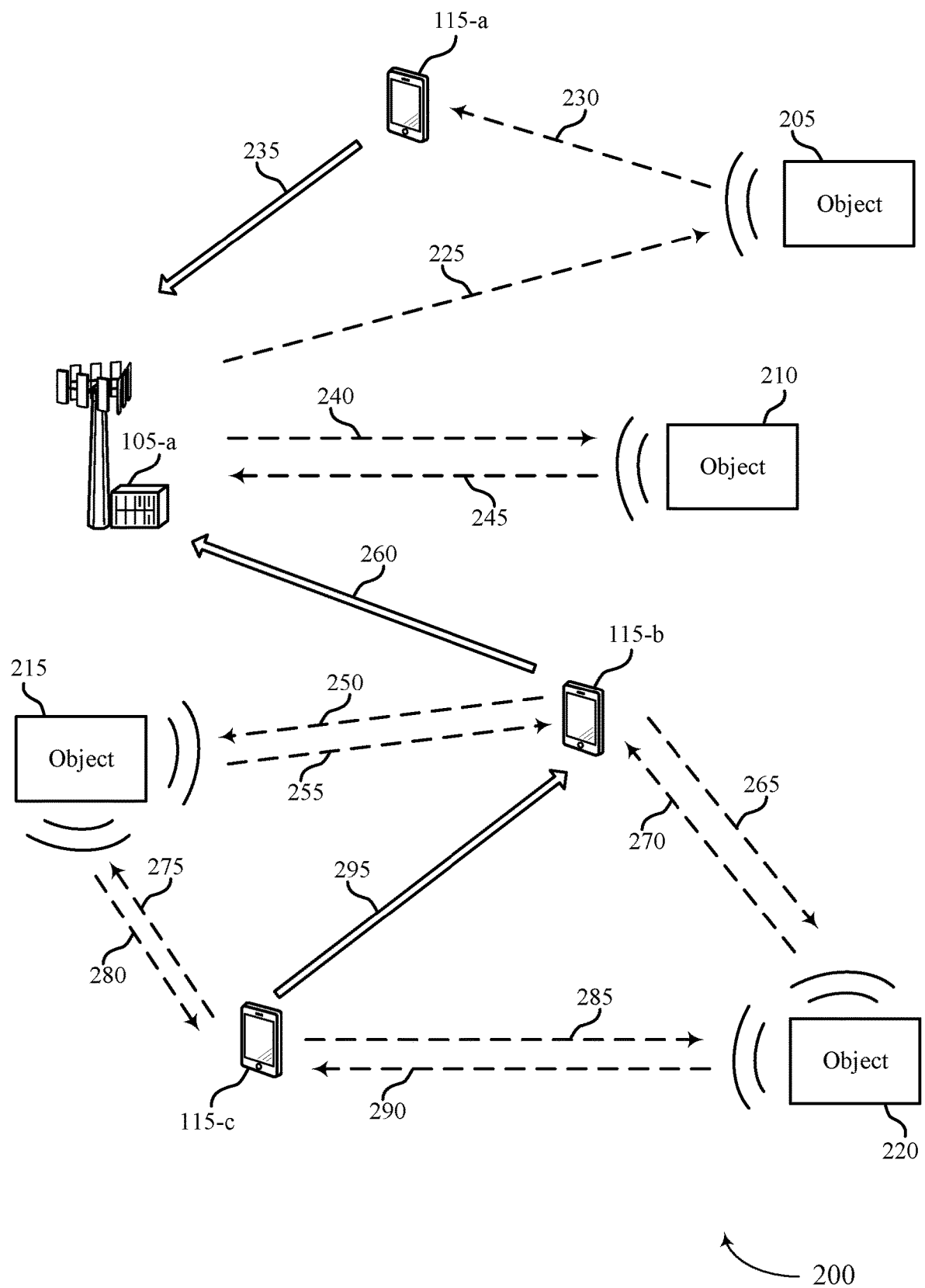
FIG. 2 illustrates an example of an environment that supports waveform reporting for cooperative sensing in accordance with aspects of the present disclosure.

In some examples, a first UE (e.g., a first UE 115 of FIG. 1) may receive a configuration for radar waveform reporting from a network node (e.g., a base station 105 or a second UE 115 of FIG. 1). In some cases, the radar waveform reporting may provide object detection for one or more objects within a detectable range of the first UE. In some examples, the first UE may receive a radar waveform (e.g., a radar waveform reflected off an object of the one or more objects). In some examples, the first UE may transmit a radar reporting message to the network node according to the received configuration. In some cases, the radar reporting message may include an indication of the received radar waveform FIG. 2 illustrates an example of an environment 200 that supports waveform reporting for cooperative sensing in accordance with aspects of the present disclosure. In some examples, environment 200 may implement aspects of wireless communications system 100.

As shown, environment 200 includes base station 105-a, UE 115-a, UE 115-b, UE 115-c, object 205, object 210, object 215, and object 220. In some examples, the environment 200 may provide monostatic radar, bi-static radar, and multi-static radar.

In the illustrated example, base station 105-a may emit sensing signal 225 (e.g., an emitted radar waveform). As shown, sensing signal 225 may collide with object 205. In some cases, at least a portion of sensing signal 225 may reflect off of object 205. In some cases, at least a portion of sensing signal 225 may reflect back towards base station 105-a. As shown, a portion of sensing signal 225 reflected off of object 205 may include reflected signal 230. In some cases, reflected signal 230 (e.g., a reflected radar waveform) may be received by UE 115-*a*.

In some examples, UE 115-*a* may analyze one or more aspects of reflected signal 230. In some cases, UE 115-*a* may generate a radar reporting message based on the analysis of reflected signal 230. In some cases, the radar reporting message may include one or more indications of reflected signal 230 (e.g., the received radar waveform) based on the analysis of reflected signal 230. In some cases, UE 115-*a* may generate one or more sensing maps of object 205 based on the analysis of reflected signal 230. In some cases, the one or more indications of reflected signal 230 may include a range Doppler map generated by UE 115-*a*, or an antenna-specific range Doppler map generated by UE 115-*a*, or an angle angular velocity map generated by UE 115-*a*, or a velocity range map generated by UE 115-*a*, or any combination thereof. In some cases, UE 115-*a* may transmit, via communication 235, the radar reporting message associated with reflected signal 230 to base station 105-*a*. In some cases, UE 115-*a* may transmit an entire waveform. In some cases, instead of reporting the full waveform, UE 115-*a* may perform some processing on the reflected signal 230 and transmit at least a portion of the output of the processing of the reflected signal 230 to base station 105-*a*. In some cases, base station 105-*a* or UE 115-*a*, or both, may track object 205 based on the one or more indications of reflected signal 230.

In the illustrated example, base station 105-*a* may emit sensing signal 240. As shown, sensing signal 240 may collide with object 210. In some cases, at least a portion of sensing signal 240 may reflect off of object 210. As shown, at least a portion of sensing signal 240 may reflect back towards base station 105-*a*. In some cases, a portion of sensing signal 240 reflected off of object 210 may include reflected signal 245. In some cases, reflected signal 245 may be received by base station 105-*a*.

In some examples, base station 105-*a* may analyze one or more aspects of reflected signal 245. In some cases, the analysis of reflected signal 245 may include one or more indications of reflected signal 245. In some cases, base station 105-*a* may generate one or more sensing maps of object 210 based on the analysis of reflected signal 245. In some cases, the one or more indications of reflected signal 245 may include a range Doppler map generated by base station 105-*a*, or an antenna-specific range Doppler map generated by base station 105-*a*, or an angle angular velocity map generated by base station 105-*a*, or a velocity range map generated by base station 105-*a*, or any combination thereof. In some cases, base station 105-*a* may track object 210 based on the one or more indications of reflected signal 245.

In the illustrated example, UE 115-*b* may emit sensing signal 250. As shown, sensing signal 250 may collide with object 215. In some cases, at least a portion of sensing signal 250 may reflect off of object 215. As shown, at least a portion of sensing signal 250 may reflect back towards UE 115-*b*. In some cases, a portion of sensing signal 250 reflected off of object 215 may include reflected signal 255. In some cases, reflected signal 255 may be received by UE 115-*b*.

In the illustrated example, UE 115-*b* may emit sensing signal 265. As shown, sensing signal 265 may collide with object 220. In some cases, at least a portion of sensing signal 265 may reflect off of object 220. As shown, at least a portion of sensing signal 265 may reflect back towards UE 115-*b*. In some cases, a portion of sensing signal 265 reflected off of object 220 may include reflected signal 270. In some cases, reflected signal 270 may be received by UE 115-*b*.

In some examples, UE 115-*b* may analyze one or more aspects of reflected signal 255 or reflected signal 270, or both. In some cases, UE 115-*b* may generate a radar reporting message based on the analysis of reflected signal 255 or reflected signal 270, or both. In some cases, the radar reporting message may include one or more indications of reflected signal 255 based on the analysis of reflected signal 255. In some cases, the radar reporting message may include one or more indications of reflected signal 270 based on the analysis of reflected signal 270. In some cases, UE 115-*b* may generate one or more sensing maps of object 215 based on the analysis of reflected signal 255. In some cases, UE 115-*b* may generate one or more sensing maps of object 220 based on the analysis of reflected signal 270. In some cases, the one or more indications of reflected signal 255 or reflected signal 270, or both, may include a range Doppler map generated by UE 115-*b*, or an antenna-specific range Doppler map generated by UE 115-*b*, or an angle angular velocity map generated by UE 115-*b*, or a velocity range map generated by UE 115-*b*, or any combination thereof. In some cases, UE 115-*b* may transmit, via communication 260, the radar reporting message associated with reflected signal 255 or reflected signal 270, or both, to base station 105-*a*. In some cases, base station 105-*a* or UE 115-*b*, or both, may track object 215 based on the one or more indications of reflected signal 255. In some cases, base station 105-*a* or UE 115-*b*, or both, may track object 220 based on the one or more indications of reflected signal 270.

In the illustrated example, UE 115-*c* may emit sensing signal 275. As shown, sensing signal 275 may collide with object 215. In some cases, at least a portion of sensing signal 275 may reflect off of object 215. As shown, at least a portion of sensing signal 275 may reflect back towards UE 115-*c*. In some cases, a portion of sensing signal 275 reflected off of object 215 may include reflected signal 280. In some cases, reflected signal 280 may be received by UE 115-*c*.

In the illustrated example, UE 115-*c* may emit sensing signal 285. As shown, sensing signal 285 may collide with object 220. In some cases, at least a portion of sensing signal 285 may reflect off of object 220. As shown, at least a portion of sensing signal 285 may reflect back towards UE 115-*c*. In some cases, a portion of sensing signal 285 reflected off of object 220 may include reflected signal 290. In some cases, reflected signal 290 may be received by UE 115-*c*.

In some examples, UE 115-*c* may analyze one or more aspects of reflected signal 280 or reflected signal 290, or both. In some cases, UE 115-*c* may generate a radar reporting message based on the analysis of reflected signal 280 or reflected signal 290, or both. In some cases, the radar reporting message may include one or more indications of reflected signal 280 based on the analysis of reflected signal 280. In some cases, the radar reporting message may include one or more indications of reflected signal 290 based on the analysis of reflected signal 290. In some cases, UE 115-*c* may generate one or more sensing maps of object 215 based on the analysis of reflected signal 280. In some cases, UE 115-*c* may generate one or more sensing maps of object 220 based on the analysis of reflected signal 290. In some cases, the one or more indications of reflected signal 280 or reflected signal 290, or both, may include a range Doppler map generated by UE 115-*c*, or an antenna-specific range Doppler map generated by UE 115-*c*, or an angle angular velocity map generated by UE 115-c, or a velocity range map generated by UE 115-c, or any combination thereof. In some cases, UE 115-c may transmit, via communication 295, the radar reporting message associated with reflected signal 280 or reflected signal 290, or both, to UE 115-b. In some cases, UE 115-b may transmit, via communication 260, the radar reporting message associated with reflected signal 280 or reflected signal 290, or both, to base station 105-a. In some cases, base station 105-a, or UE 115-b, or UE 115-c, or any combination thereof, may track object 215 based on the one or more indications of reflected signal 280. In some cases, base station 105-a, or UE 115-b, or UE 115-c, or any combination thereof, may track object 220 based on the one or more indications of reflected signal 290.

In some examples, the tracking of objects may include health monitoring (e.g., heartbeat detection, respiration rate monitoring), or gesture recognition (e.g., human activity recognition, keystroke detection, sign language recognition, etc.), or contextual information acquisition (e.g., object location detection, object tracking, object direction finding, object range estimation, object velocity estimation), or automotive radar (e.g., smart cruise control, collision avoidance, etc.), or any combination thereof. In some examples, the tracking of objects may include environment scanning for self-organization network (SON), indoor factory environments, etc. In some examples, sensing signals (e.g., sensing signal 225, sensing signal 240, sensing signal 250, reflected signal 270, sensing signal 275, sensing signal 285) may include or be based on a communication waveform (e.g., a downlink communication signal, an uplink communication signal, a millimeter wave communication signal, FR2, FR2x, FR4, etc.).

The present techniques may reduce power consumption and free up processing cycles of one or more devices (e.g., battery-operated sensing devices, UE 115-a, UE 115-b, UE 115-c) by offloading the tracking of objects to one or more sensing management functions (SMFs), thus improving user experience of the one or more devices with longer battery life and improved quality of service. In some cases, the SMFs may include one or more devices (e.g., base station 105-a, a network device, a network router, a network gateway, etc.) responsible for supporting, managing, and tracking of sensing output of a given environment (e.g., environment 200).

Figure 3:
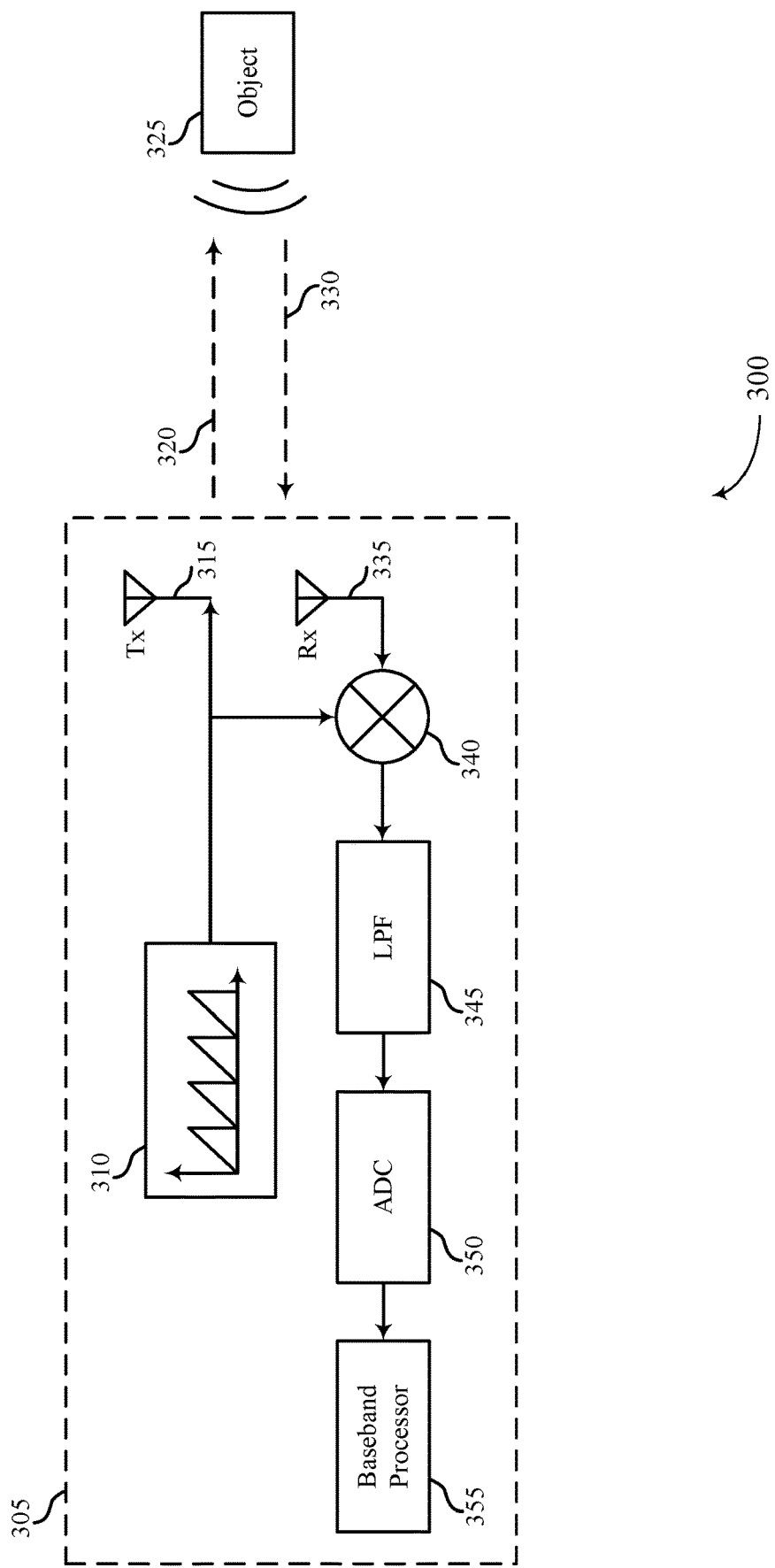
FIG. 3 illustrates an example of a device diagram that supports waveform reporting for cooperative sensing in accordance with aspects of the present disclosure.

FIG. 3 illustrates an example of a device diagram 300 that supports waveform reporting for cooperative sensing in accordance with aspects of the present disclosure. In some examples, device diagram 300 may implement aspects of wireless communications system 100.

In the illustrated example, device diagram 300 may include device 305 and object 325. Device 305 may be an example of a base station (e.g., base station 105 of FIG. 1 or FIG. 2), a UE (e.g., UE 115 of FIG. 1 or FIG. 2), a network device, a network node, etc. As shown, device 305 may include radio frequency (RF) generator 310, a transmitter 315, receiver 335, mixer 340, low-pass filter (LPF) 345, analog to digital converter (ADC) 350, and baseband processor 355.

In some examples, RF generator 310 may generate frequencies for transmitting radar waveform 320 (e.g., based on an analog signal received from a converter of device 305). In some cases, RF generator 310 may generate a chirp signal (e.g., sawtooth RF waveform) with multiple chirps, where each chirp includes a start frequency (e.g., 77 GHz), a linear rise in the frequency of a given slope over a given duration (e.g., 40 microseconds), drops off at an end frequency (e.g., 81 GHz), and has some bandwidth (e.g., 4 GHz bandwidth). In some cases, a phase difference between two adjacent chirps may be less than 180 degrees to avoid ambiguity. In some cases, a radar waveform generated by RF generator 310 that is configured by RF generator 310 to have N chirps enables device 305 to measure (e.g., detect, locate, track, etc.) up to (N−1) objects (e.g., object 325). In some cases, RF generator 310 may include a voltage controlled oscillator (VCO) to generate radar waveform 320.

In the illustrated example, device 305 may emit a radar waveform 320. As shown, radar waveform 320 may collide with object 325. In some cases, at least a portion of radar waveform 320 may reflect off of object 325. In some cases, at least a portion of radar waveform 320 may reflect back towards device 305. As shown, a portion of radar waveform 320 reflected off of object 325 may include reflected radar waveform 330. In some cases, reflected radar waveform 330 (e.g., a reflected radar waveform) may be received by device 305.

In some cases, receiver 335 may input the reflected radar waveform 330 to mixer 340. In some cases, device 305 may amplify or down-convert reflected radar waveform 330 (e.g., between receiver 335 and mixer 340) and feed the amplified or down-converted waveform of reflected radar waveform 330 to mixer 340. In some cases, mixer 340 may combine the reflected radar waveform 330 with the transmitted radar waveform 320 received from RF generator 310, or mixer 340 may multiply the transmitted radar waveform 320 received from RF generator 310 by the reflected radar waveform 330, or both. In some cases, mixer 340 may isolate a beat frequency value of reflected radar waveform 330.

In some cases, the output of mixer 340 (e.g., the mixed waveforms of radar waveform 320 and reflected radar waveform 330) may be received by LPF 345. In some cases, LPF 345 may allow signals of the output of mixer 340 with a frequency lower than a selected cutoff frequency to pass on to ADC 350, and attenuate signals of the output of mixer 340 with frequencies higher than the cutoff frequency. In some cases, the sampling rate of ADC 350 may be larger than twice the maximum mixed signal frequency of radar waveform 320 or reflected radar waveform 330 (e.g., to avoid aliasing).

In some cases, the output of LPF 345 may be received by baseband processor 355. In some examples, baseband processor 355 may analyze one or more aspects of the output of ADC 350 (e.g., mixed, low-pass filtered, converted aspects of reflected radar waveform 330). In some cases, baseband processor 355 may generate a radar reporting message based on the analysis of the output of ADC 350. In some cases, the radar reporting message may include one or more indications of reflected radar waveform 330 based on the analysis performed by baseband processor 355. In some cases, baseband processor 355 may generate one or more sensing maps of object 325 based on the analysis performed by baseband processor 355. In some cases, the one or more indications of reflected radar waveform 330 may include a range Doppler map generated by baseband processor 355, or an antenna-specific range Doppler map generated by baseband processor 355, or an angle angular velocity map generated by baseband processor 355, or a velocity range map generated by baseband processor 355, or any combination thereof. In some cases, device 305 may transmit, via transmitter 315, the radar reporting message associated with reflected radar waveform 330 to a network device (e.g., sensing management function (SMF)). In some cases, device 305 or the network device, or both, may track object 325 based on the one or more indications of reflected radar waveform 330.

In some examples, device 305 may report reflected radar waveform 330 to a network device (e.g., base station, SMF, etc.) without processing reflected radar waveform 330. In some cases, the network device may process reflected radar waveform 330 received from device 305. In some cases, device 305 may mix and filter reflected radar waveform 330 (e.g., via mixer 340, or LPF 345, or ADC 350, or any combination thereof) and report a time-domain waveform obtained from mixing and filtering reflected radar waveform 330. In some cases, the time-domain waveform depends on a quantization levels, a maximum configured ADC bandwidth, etc.

In some examples, device 305 may report a range-chirp representation (e.g., map) or range-Doppler representation of reflected radar waveform 330 may be reported to the network device (e.g., reported per antenna of device 305). In some examples, device 305 may report a relatively complete representation (e.g., range-chirp representation, range-Doppler representation, and angle-angular velocity representation) of reflected radar waveform 330 (e.g., for uniform linear/planar antenna arrays). In some examples, device 305 may report a single dimension (e.g., report a Doppler dimension without range when range is constant, etc.).

In some cases, device 305 may map reflected radar waveform 330 to a compressed representation of reflected radar waveform 330 and send the compressed output to the network device (e.g., sensing entity, SMF). In some cases, the compressed representation may be determined based on a compression algorithm, or a trained model based on machine learning, or autoencoder based channel representation, or generative adversarial networks (GAN) based channel representation, or any combination thereof. In some cases, a network node or base station may configure how the compressed representation is determined. In some cases, the network node or base station may provide a configuration (e.g., configuration for radar waveform reporting) that indicates how the compressed representation is determined. Thus, in some cases, the configuration may indicate that the compressed representation is to be determined based on a compression algorithm, or a trained model based on machine learning, or autoencoder based channel representation, or GAN based channel representation, or any combination thereof. In some cases, a training phase may be established a-priori, or a model/representation learned by device 305. In some cases, a compressed representation may be configurable by parameters that influence the output. In some cases, one or more range/Doppler/angle maps may be a particular case of such representation. In some cases, the representation parameters may be configured by the network device, or set by device 305 and communicated to the network device with the representation of the reflected radar waveform 330.

Figure 4:
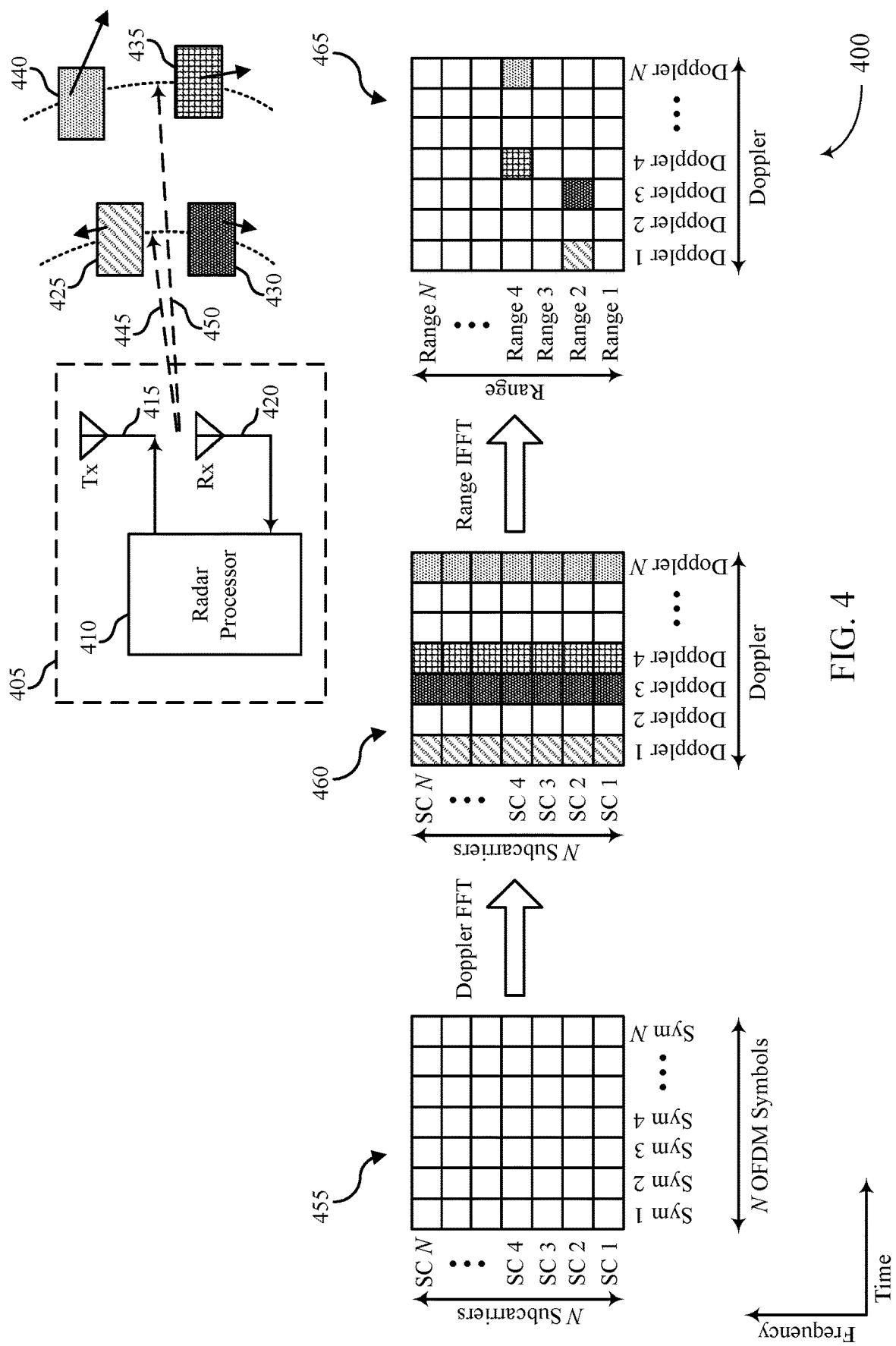
FIG. 4 illustrates an example of an antenna array that supports waveform reporting for cooperative sensing in accordance with aspects of the present disclosure.

FIG. 4 illustrates an example of an antenna array 400 that supports waveform reporting for cooperative sensing in accordance with aspects of the present disclosure. In some examples, antenna array 400 may implement aspects of wireless communications system 100.

As shown, antenna array 400 includes device 405, object 425, object 430, object 435, and object 440. In the illustrated example, device 405 may include radar processor 410, transmitter 415, and receiver 420. Device 405 may be an example of a base station (e.g., base station 105 of FIG. 1 or FIG. 2), a UE (e.g., UE 115 of FIG. 1 or FIG. 2), device 305 of FIG. 3, a network device, a network node, etc. In some cases, radar processor 410 may be an example of baseband processor 355 of FIG. 3.

In some examples, transmitter 415 may emit one or more radar waveforms. The one or more radar waveforms may include one or more communication waveforms (e.g., orthogonal frequency-division multiplexing (OFDM) waveforms, discrete Fourier transform (DFT) spread (DFT-S), DFT-S, single carrier FDMA, etc.). In some cases, receiver 420 may detect one or more reflected radar waveforms based on the one or more radar waveforms emitted by transmitter 415. In some cases, radar processor 410 may analyze the one or more reflected radar waveforms. In some cases, device 405 may detect object 425, object 430, object 435, and object 440 based on the analysis of the one or more reflected radar waveforms by radar processor 410.

In some cases, based on the analysis of the one or more reflected radar waveforms by radar processor 410, device 405 may determine waveform information including Doppler information (e.g., determine an object is moving towards or away from device 405), or range information (e.g., object 425 and object 430 at range 445, object 435 and object 440 at range 450), or angle information (e.g., angle of a reflected radar waveform incident on an antenna of device 405), or direction information (e.g., an estimated direction of travel of an object, a direction of object 425 indicated by the vector emanating from object 425, a direction of object 430 indicated by the vector emanating from object 430, etc.), or velocity information (e.g., an estimated speed of an object, a velocity of object 435 indicated by a magnitude of the vector emanating from object 435, a velocity of object 440 indicated by a magnitude of the vector emanating from object 440, etc.), or acceleration information (e.g., a change in speed of an object over some time period), or angular velocity information (e.g., a determined rate of change in an incident angle of the reflected radar waveform on an antenna of the device 405 over some time period), or any combination thereof. In some cases, Doppler information may include radial velocity information (e.g., a relative change in radius from a base station per unit time).

In some cases, device 405 may determine the waveform information based on radar processor 410 performing one or more Fourier transforms (e.g., Doppler fast Fourier transform (FFT), row-wise FFT, range inverse FFT (IFFT), column-wise IFFT). In some cases, device 405 may determine the waveform information based on radar processor 410 performing subspace statistical analyses (e.g., sinusoidal frequency estimation, multiple signal classification (MUSIC), subspace rotation (SUR) estimation, estimation of signal parameters via rotational invariance techniques (ESPRIT), etc.).

In some examples, device 405 may receive one or more reflected data communication waveforms with N subcarriers and N OFDM symbols. In some cases, grid 455 may represent a grid of the subcarrier rows and the symbol columns associated with the one or more reflected data communication waveforms received by device 405. In some examples, radar processor 410 may analyze the one or more reflected data communication waveforms received by device 405. In some cases, device 405 may determine Doppler information based on the analysis of the one or more reflected data communication waveforms received by device 405.

In some examples, grid 460 may represent a grid of the subcarrier rows and Doppler columns based on the determined Doppler information associated with the one or more reflected data communication waveforms received by device 405. In some cases, radar processor 410 may perform a row-wise fast Fourier transform on the subcarrier rows and symbol columns of grid 455 to compute the Doppler column values of grid 460.

In some examples, grid 465 may represent a grid of the range rows and Doppler columns based on the determined range information associated with the one or more reflected data communication waveforms received by device 405. In some cases, radar processor 410 may perform a column-wise inverse fast Fourier transform on the subcarrier rows and Doppler columns of grid 460 to compute the range row values of grid 465 (e.g., range-Doppler map).

As shown, device 405 determines, via the computed range-Doppler map of grid 465, that object 425 is at a first Doppler level (e.g., Doppler 1 of grid 465) and a second range (e.g., Range 2, range 445), object 430 is at a third Doppler level (e.g., Doppler 3 of grid 465) and a second range (e.g., Range 2, range 445), object 435 is at a fourth Doppler level (e.g., Doppler 4 of grid 465) and a fourth range (e.g., Range 4, range 450), and object 440 is at a Nth Doppler level (e.g., Doppler N of grid 465) and a fourth range (e.g., Range 4, range 450).

In some cases, device 405 may generate a radar reporting message based on the analysis of one or more reflected waveforms (e.g., a waveform reflected off of object 425, a waveform reflected off of object 430, etc.). In some examples, a network device (e.g., base station) may configure device 405 with fast Fourier transform dimensions or subcarrier statistical analysis dimensions, or both. In some examples, device 405 may be configured to report all the bins (e.g., FFT bins) that satisfy a specified or signaled criteria (e.g., all bins above a threshold, based on the configuration from the base station, etc.).

In some cases, device 405 may report time-domain samples, which may be a function of a quantization used for the samples, or a sampling rate, or a time domain mask, or an analog filter, or a size of an associated bandwidth part, or an associated band, or an associated component carrier (e.g., FR1 vs. FR2, etc.), or analog filter classes at device 405, or digital filtering of the time domain samples etc., or any combination thereof. In some cases, the sampling rate may depend on an implementation of device 405.

In some examples, device 405 and one or more other devices may report radar waveform reporting to a network node. In some cases, device 405 may have a sampling rate that is different from at least one of the one or more other device (e.g., for the time domain samples). In some cases, the time domain mask may be selected samples, including additional samples before and after the OFDM symbol boundaries to account for timing uncertainty, etc.

In some cases, the radar waveform reporting may include frequency-domain representation. In some cases, device 405 may report all OFDM symbol tones to the network device. In some cases, device 405 may report those symbols that are detected by device 405, or those tones that are detected by device 405, or both.

Figure 5:
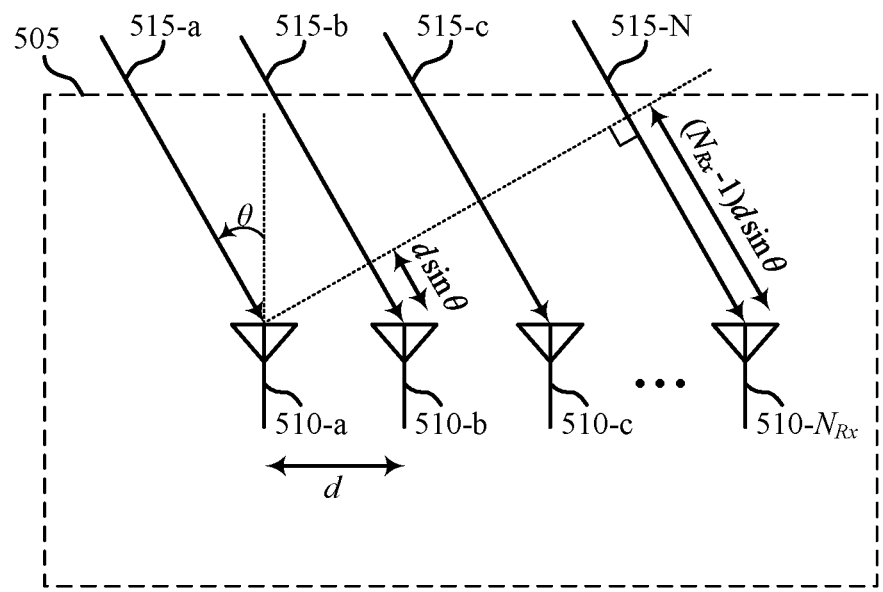
FIG. 5 illustrates an example of an antenna array that supports waveform reporting for cooperative sensing in accordance with aspects of the present disclosure.

FIG. 5 illustrates an example of an antenna array 500 that supports waveform reporting for cooperative sensing in accordance with aspects of the present disclosure. In some examples, antenna array 500 may implement aspects of wireless communications system 100.

As shown, antenna array 500 depicts N antennas of device 505. In the illustrated example, the N antennas of device 505 may include antenna 510-*a*, antenna 510-*b*, antenna 510-*c*, to antenna 510-N$_{Rx}$. Device 505 may be an example of a base station (e.g., base station 105 of FIG. 1 or FIG. 2), a UE (e.g., UE 115 of FIG. 1 or FIG. 2), device 305 of FIG. 3, device 405 of FIG. 4, a network device, a network node, etc.

In the illustrated example, multiple instances of a reflected waveform 515 (e.g., reflected waveform 515-*a* to reflected waveform 515-N) may be incident on the N antennas of device 505. In some cases, device 505 may determine an angle of incidence θ for the multiple instances of reflected waveform 515. In some cases, device 505 may detect up to (N$_{RX}$−1) targets (e.g., one less target than the number of antennas of device 505, such as device 505 with five antennas being capable of tracking four targets, etc.). With the N antennas at device 505, device 505 may estimate an angle-angular velocity map and communicate the angle-angular velocity map to a network device.

In some cases, device 505 may determine a time of arrival differential based on a difference of the times that the multiple instances of a reflected waveform 515 arrive at their respective antennas. As shown, some may separate the multiple instances of a reflected waveform 515 (e.g., distanced separates antenna 510-*a* from antenna 510-*b*, etc.). In some cases, device 505 may determine the time of arrival differential between a time of arrival of reflected waveform 515-*a* at antenna 510-*a* and a time of arrival of reflected waveform 515-*a* at antenna 510-*b* based on calculating d*sin(θ), etc.

In some examples, device 505 may report information regarding a received waveform signal after filtering out stationary paths (e.g., clutter) from the received waveform signal. In some cases, device 505 may report a differential relative to a previously reported range/Doppler/angle representation. In some examples, a network device (e.g., SMF) may collect multiple local maps (e.g., range-Doppler map, angle-angular velocity map, etc.) from each associated receiving node (e.g., device 505 and other network nodes, UEs, other network devices, etc.). In some cases, the network device may analyze the combined data received from all of the receiving nodes. In some cases, the network device may perform additional functionalities (e.g., tracking of one or more objects, identifying a particular object and tracking the identified object, etc.) based on the analysis of the combined data.

Figure 6:
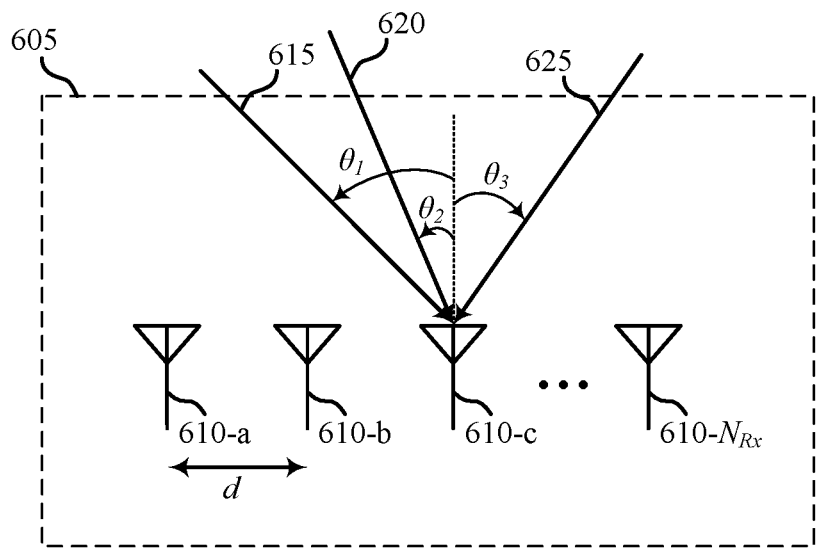
FIG. 6 illustrates an example of an antenna array that supports waveform reporting for cooperative sensing in accordance with aspects of the present disclosure.
Figure 6:
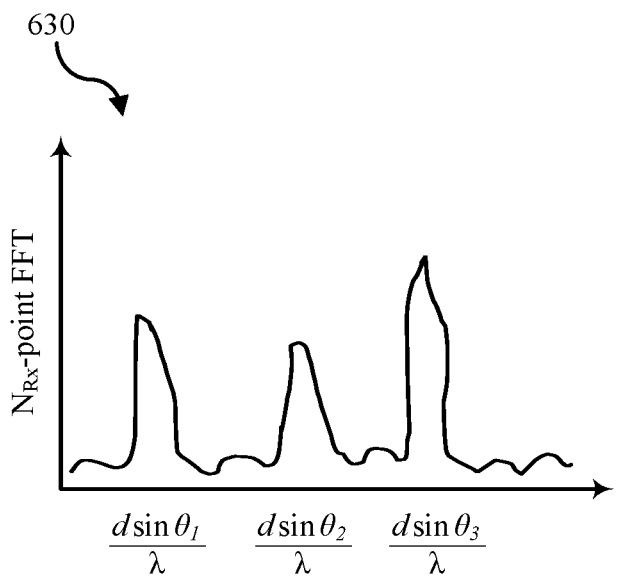

FIG. 6 illustrates an example of an antenna array 600 that supports waveform reporting for cooperative sensing in accordance with aspects of the present disclosure. In some examples, antenna array 600 may implement aspects of wireless communications system 100.

As shown, antenna array 600 depicts N antennas of device 605. In the illustrated example, the N antennas of device 605 may include antenna 610-*a*, antenna 610-*b*, antenna 610-*c*, to antenna 610-N$_{Rx}$. Device 605 may be an example of a base station (e.g., base station 105 of FIG. 1 or FIG. 2), a UE (e.g., UE 115 of FIG. 1 or FIG. 2), device 305 of FIG. 3, device 405 of FIG. 4, device 5405 of FIG. 5, a network device, a network node, etc.

In the illustrated example, multiple reflected waveforms (e.g., reflected waveform 615, reflected waveform 620, reflected waveform 625) may be incident on antenna 610-*c* of the N antennas of device 605. In some examples, device 605 may process the multiple reflected waveforms to determine waveform information regarding each of the multiple reflected waveforms. In some cases, device 605 may determine a first angle of incidence θ$_1$ for the reflected waveform 615, a second angle of incidence θ$_2$ for the reflected waveform 620, and a third angle of incidence θ$_3$ for the reflected waveform 625.

In some cases, device 605 may calculate a fast Fourier transform of reflected waveform 615 at (d sin θ$_1$)/(λ), a fast Fourier transform of reflected waveform 620 at (d sin θ$_2$)(λ), and a fast Fourier transform of reflected waveform 625 at (d sin θ₃)(λ). In some cases, device 605 may map the respective calculated fast Fourier transforms as shown in graph 630. In some cases, device 605 may report to a network device waveform information for the multiple reflected waveforms 615, 620, 625 (e.g., graph 630, one or more determined coordinates of graph 630, etc.). In some cases, device 605 or the network device, or both, may determine location information (e.g., track one or more objects) based at least in part on the respective calculated fast Fourier transforms.

Figure 7:
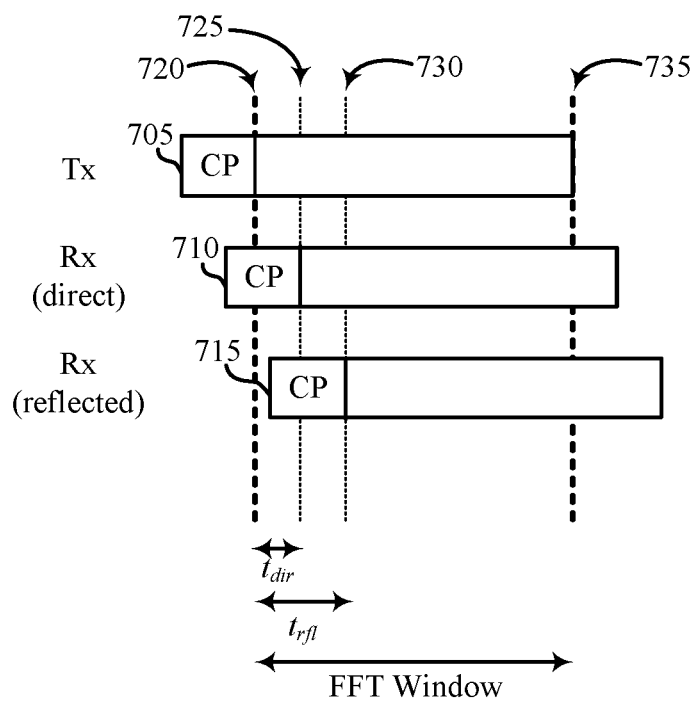
FIG. 7 illustrates an example of an environment that supports waveform reporting for cooperative sensing in accordance with aspects of the present disclosure.

FIG. 7 illustrates an example of an environment 700 that supports waveform reporting for cooperative sensing in accordance with aspects of the present disclosure. In some examples, environment 700 may implement aspects of wireless communications system 100.

As shown, environment 700 depicts a transmitted waveform 705 with configured chirp parameters (CP) transmitted by a first network device (e.g., a waveform transmitting device, a sensing management function (SMF), object tracking device, etc.), a direct waveform 710 received directly by a second network device (e.g., a waveform receiving device), and a reflected waveform 715 received by the second network device after reflecting off an object.

In some cases, a range/Doppler/angle/velocity map may be communicated based on multiple antennas at the second network device. Depending on the synchronization level, the associated ranges measured may include a time of flight from the first network device to the second network device, or a time of flight from the first network device to the object to the second network device, or both. In some cases, a distance between the first network device and the second network device may be known by the first network device or the second network device, or both. In some cases, the distance between the first network device and the second network device may enable or enhance (e.g., increase the accuracy of) location estimation operations performed by the first network device or the second network device, or both.

In the illustrated example, the first network device and second network device may include multi-dimensional synchronization (e.g., via global positioning system (GPS) synchronization). Based on the synchronization, the second network device may determine a start time 720 at which the first network device transmits transmitted waveform 705. In some cases, the second network device may determine the direct arrival time 725 based on receiving direct waveform 710 (e.g., based on the second network device detecting the chirp parameters (CP) of direct waveform 710). In some cases, the second network device may determine the reflected arrival time 730 based on receiving reflected waveform 715 (e.g., based on the second network device detecting the chirp parameters (CP) of reflected waveform 715).

In some cases, the second network device may determine a direct differential time based on the difference between the start time 720 and the direct arrival time 725. In some cases, the direct differential time may be equivalent to two-times the direct range (e.g., $2R_{dir}$, a range between the second network device and the first network device) divided by the speed of light (c). In some cases, the second network device may determine a reflected differential time based on the difference between the start time 720 and the reflected arrival time 730. In some cases, the reflected differential time may be equivalent to two-times the reflected range (e.g., $2R_{rfl}$, a range between the second network device and the object) divided by the speed of light (c). In some cases, environment 700 may include a fast Fourier transform (FFT) window between the determined start time 720 and a determined end time 735 of transmitted waveform 705 (e.g., determined via the GPS synchronization).

Figure 8:
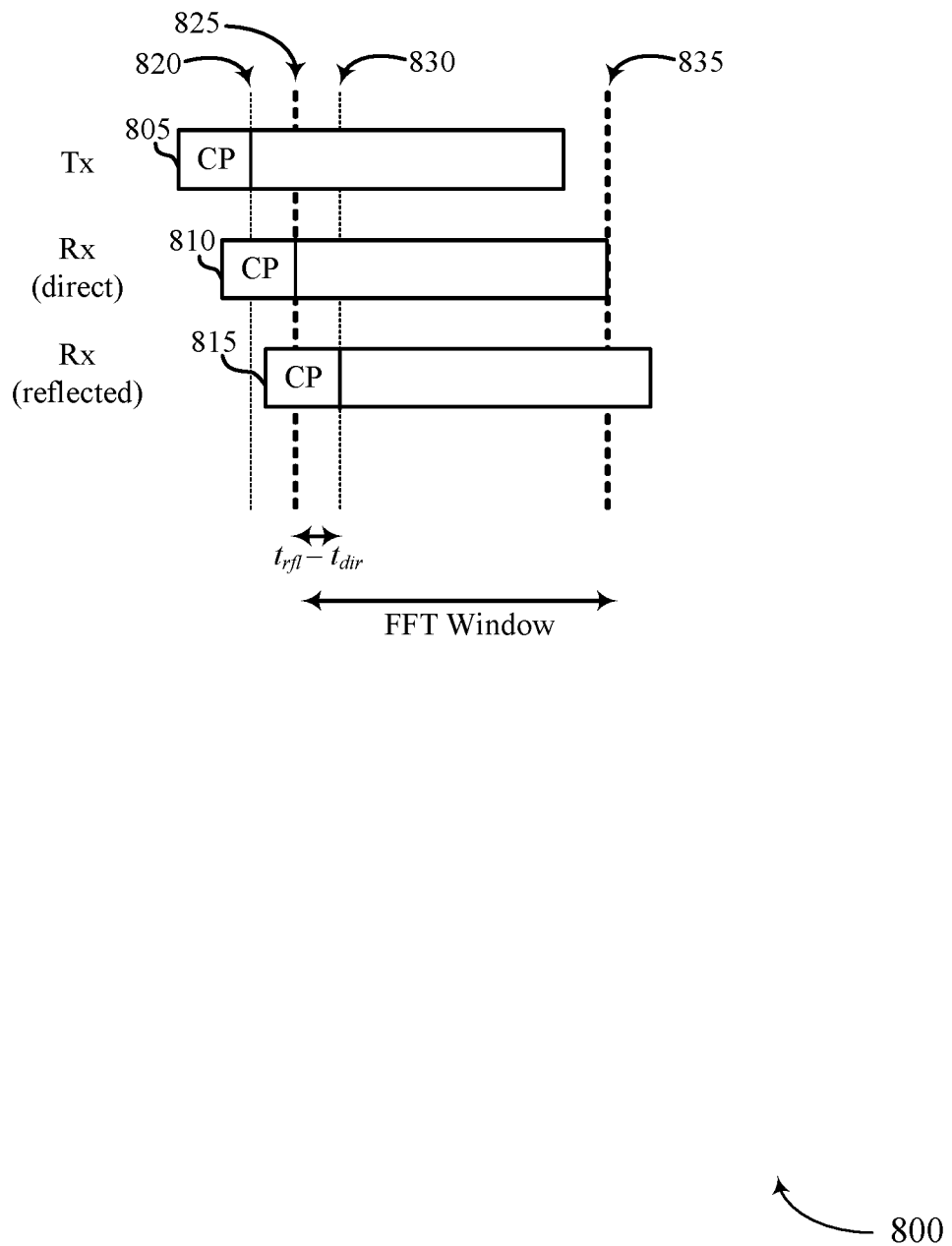
FIG. 8 illustrates an example of an environment that supports waveform reporting for cooperative sensing in accordance with aspects of the present disclosure.

FIG. 8 illustrates an example of an environment 800 that supports waveform reporting for cooperative sensing in accordance with aspects of the present disclosure. In some examples, environment 800 may implement aspects of wireless communications system 100.

As shown, environment 800 depicts a transmitted waveform 805 with configured chirp parameters (CP) transmitted by a first network device (e.g., a waveform transmitting device, a sensing management function (SMF), object tracking device, etc.), a direct waveform 810 received directly by a second network device (e.g., a waveform receiving device), and a reflected waveform 815 received by the second network device after reflecting off an object.

In the illustrated example, the first network device and second network device may be synchronized based on air-interface synchronization (e.g., via synchronization signal block (SSB) synchronization). Based on a lack of synchronization, the second network device may not know a start time 820 at which the first network device transmits transmitted waveform 805. In some cases, the second network device may determine the direct arrival time 825 based on receiving direct waveform 810 (e.g., based on the second network device detecting the chirp parameters (CP) of direct waveform 810). In some cases, the second network device may determine the reflected arrival time 830 based on receiving reflected waveform 815 (e.g., based on the second network device detecting the chirp parameters (CP) of reflected waveform 815).

In some cases, without knowing the start time 820, the second network device may determine a direct reflected differential time based on the difference between the direct arrival time 825 and the reflected arrival time 830 (e.g., $t_{rfl}-t_{dir}$).

In some cases, environment 800 may include a FFT window between the direct arrival time 825 and a determined end time 835 of direct waveform 810 (e.g., determined via the SSB synchronization).

Figure 9:
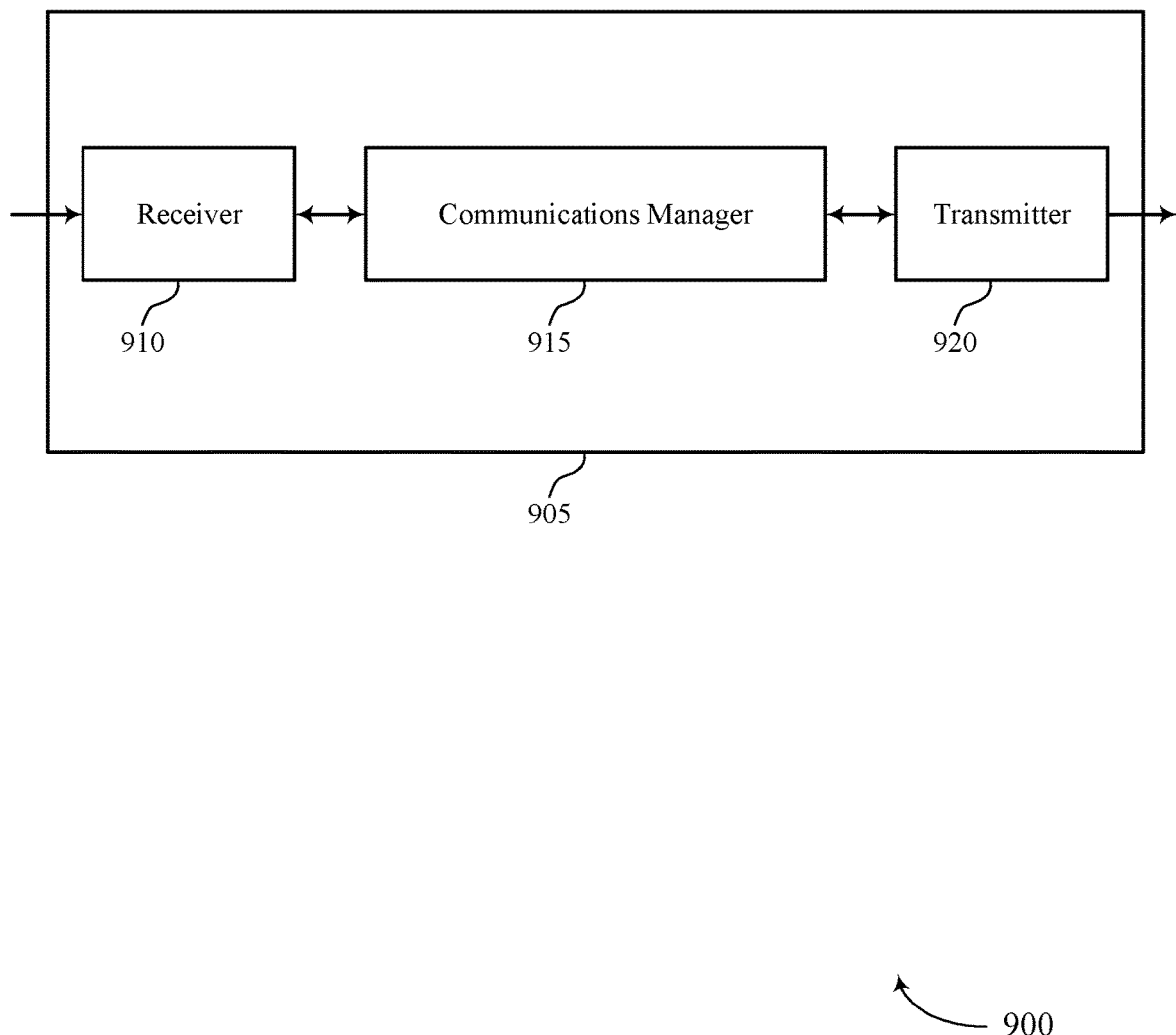
FIGS. 9 and 10 show block diagrams of devices that support waveform reporting for cooperative sensing in accordance with aspects of the present disclosure.

FIG. 9 shows a block diagram 900 of a device 905 that supports waveform reporting for cooperative sensing in accordance with aspects of the present disclosure. The device 905 may be an example of aspects of a UE 115 as described herein. The device 905 may include a receiver 910, a communications manager 915, and a transmitter 920. The device 905 may also include a processor (not shown). Each of these components may be in communication with one another (e.g., via one or more buses).

The receiver 910 may receive information such as packets, user data, or control information associated with various information channels (e.g., control channels, data channels, and information related to waveform reporting for cooperative sensing, etc.). Information may be passed on to other components of the device 905. The receiver 910 may be an example of aspects of the transceiver 1220 described herein with reference to FIG. 12. The receiver 910 may utilize a single antenna or a set of antennas.

The communications manager 915 may receive, from a network node, a configuration for radar waveform reporting, the radar waveform reporting for object detection for one or more objects within a detectable range of the UE, receive a radar waveform, and transmit, to the network node according to the received configuration, a radar reporting message including an indication of one or more parameter values associated with the received radar waveform. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described herein with reference to FIG. 12. The transmitter 920 may utilize a single antenna or a set of antennas.

Figure 10:
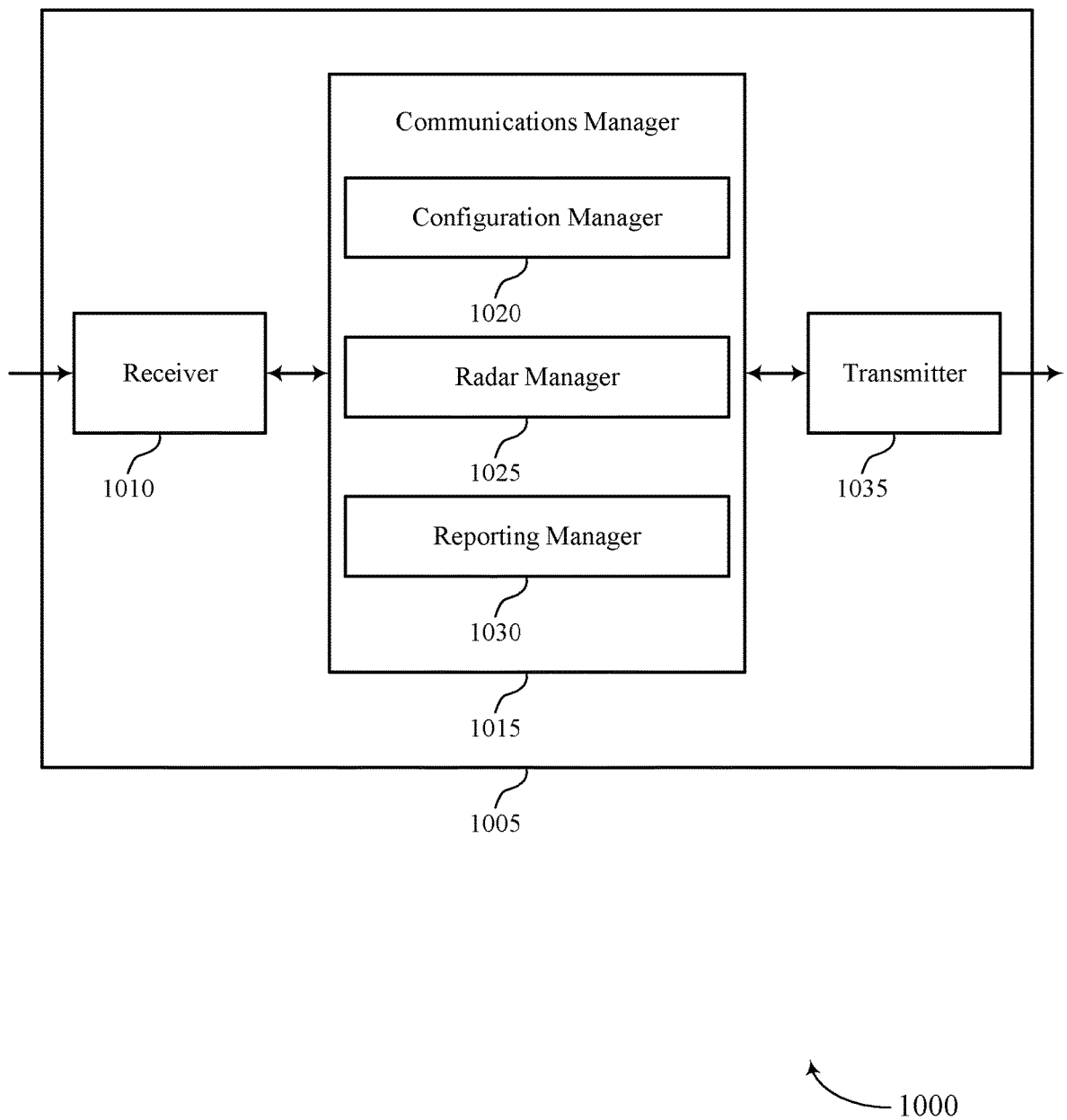

FIG. 10 shows a block diagram 1000 of a device 1005 that supports waveform reporting for cooperative sensing in accordance with aspects of the present disclosure. The device 1005 may be an example of aspects of a device 905, or a UE 115 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to waveform reporting for cooperative sensing, etc.). Information may be passed on to other components of the device 1005. The receiver 1010 may be an example of aspects of the transceiver 1220 described herein with reference to FIG. 12. The receiver 1010 may utilize a single antenna or a set of antennas.

The communications manager 1015 may be an example of aspects of the communications manager 915 as described herein. The communications manager 1015 may include a configuration manager 1020, a radar manager 1025, and a reporting manager 1030. The communications manager 1015 may be an example of aspects of the communications manager 1210 described herein.

The configuration manager 1020 may receive, from a network node, a configuration for radar waveform reporting, the radar waveform reporting for object detection for one or more objects within a detectable range of the UE. The radar manager 1025 may receive a radar waveform. The reporting manager 1030 may transmit, to the network node according to the received configuration, a radar reporting message including an indication of one or more parameter values associated with the received radar waveform.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described herein with reference to FIG. 12. The transmitter 1035 may utilize a single antenna or a set of antennas.

Figure 11:
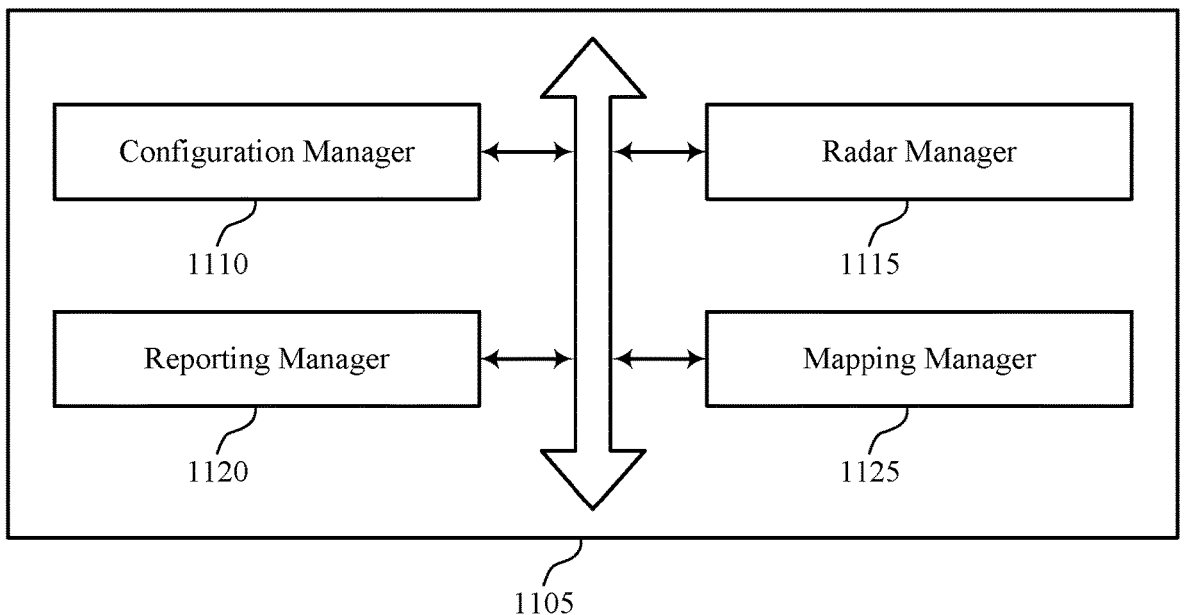
FIG. 11 shows a block diagram of a communications manager that supports waveform reporting for cooperative sensing in accordance with aspects of the present disclosure.

FIG. 11 shows a block diagram 1100 of a communications manager 1105 that supports waveform reporting for cooperative sensing in accordance with aspects of the present disclosure. The communications manager 1105 may be an example of aspects of a communications manager 915, a communications manager 1015, or a communications manager 1210 described herein. The communications manager 1105 may include a configuration manager 1110, a radar manager 1115, a reporting manager 1120, and a mapping manager 1125. Each of these modules may communicate, directly or indirectly, with one another (e.g., via one or more buses).

The configuration manager 1110 may receive, from a network node, a configuration for radar waveform reporting, the radar waveform reporting for object detection for one or more objects within a detectable range of the UE. In some examples, receiving the radar waveform includes receiving a reflected transmission of the radar waveform when the UE transmits the radar waveform, or receiving the reflected transmission of the radar waveform and receiving a direct transmission of the radar waveform when another UE, the network node, or a second network node transmits the radar waveform.

In some examples, the configuration manager 1110 may perform synchronization with the network node. In some examples, the configuration manager 1110 may determine a start time for transmission of the radar waveform based on the performed synchronization.

In some examples, the configuration manager 1110 may determine a direct time of flight of the direct transmission of the radar waveform based on the determined start time and a direct arrival time of the direct transmission. In some examples, the configuration manager 1110 may determine a reflected time of flight of the reflected transmission of the radar waveform based on the determined start time and a reflected arrival time of the reflected transmission.

In some examples, the configuration manager 1110 may determine a differential time of flight based on a difference of the reflected arrival time of the reflected transmission and the direct arrival time of the direct transmission. In some cases, the one or more parameter values associated with the received radar waveform include one or more time-domain samples of the received radar waveform obtained by the UE at a configured sampling rate. In some cases, the one or more parameter values associated with the received radar waveform include one or more frequency-domain samples of the received radar waveform obtained by the UE at a configured sampling rate.

In some cases, the one or more frequency-domain samples include each symbol and tone of the received radar waveform. In some cases, the configuration for radar waveform reporting includes one or more fast Fourier transform dimensions and configures the UE to report parameters that satisfy one or more of configured parameter criteria, and where the one or more parameter values associated with the received radar waveform include the parameters.

In some cases, the radar waveform includes an orthogonal frequency-division multiplexing waveform, or a discrete Fourier transform spreading waveform, or a single carrier waveform, or a frequency-modulated continuous-wave waveform, or any combination thereof.

The radar manager 1115 may receive a radar waveform. The reporting manager 1120 may transmit, to the network node according to the received configuration, a radar reporting message including an indication of one or more parameter values associated with the received radar waveform. The mapping manager 1125 may determine the one or more parameter values based on receiving the radar waveform.

In some examples, mapping manager 1125 may generate a map that maps at least a first parameter value of the one or more parameter values to a second parameter value of the one or more parameter values, where the indication of the one or more parameter values associated with the received radar waveform includes the generated map.

In some examples, the mapping manager 1125 may perform a row-wise operation on a first grid that includes subcarrier rows and symbol columns to compute values for Doppler columns. In some examples, performing a column-wise operation on a second grid that includes the subcarrier rows and the computed Doppler columns to compute range row values for the map, where the first parameter value includes the range information and the second parameter value includes the Doppler information, and the map includes a range-Doppler map.

In some examples, the mapping manager 1125 may perform a row-wise operation on a first grid that includes chirp rows and sample columns to compute values for range columns. In some examples, the mapping manager 1125 may perform a column-wise operation on a second grid that includes the chirp rows and the computed range columns to compute velocity row values for the map, where the first parameter value includes the velocity information and the second parameter value includes the range information, and the map includes a velocity-range map.

In some examples, the mapping manager 1125 may generate, based at least in part on the configuration for radar waveform reporting, an antenna-specific map for each antenna of multiple antennas of the UE that receives the radar waveform. In some cases, the mapping manager 1125 may generate, based at least in part on the configuration for radar waveform reporting, an antenna-aggregate map for one or more antennas of the UE that receives the radar waveform.

In some examples, the configuration for radar waveform reporting may be based on device capabilities (e.g., capabilities of a UE associated with communications manager 1105, etc.). In some cases, communications manager 1105 may report the capabilities of the device to a network node or base station and the network node or base station may configure the configuration for radar waveform reporting based on the indicated device capability. In some cases, the network node or base station may configure the configuration for radar waveform reporting based on an application specified by the device or an application requesting or associated with the configuration for radar waveform reporting.

In some examples, the configuration for radar waveform reporting may indicate that the device (e.g., a UE associated with communications manager 1105, etc.) is to report all of the maps of the antennas of the device, or to report each map for each antenna (e.g., each antenna-specific map for each antenna). The communications manager 1105 may then report the multiple maps of the device to a network node or base station. In some cases, the configuration for radar waveform reporting may indicate that the device is to report one or more specific maps for one or more specific antennas or to report one or more specific maps for each antenna. In some cases, for each antenna or for one or more antennas, the configuration for radar waveform reporting may indicate that the device is to report a range Doppler map, or an antenna-specific range Doppler map, or an angle angular velocity map, or a velocity range map, or any combination thereof. In some cases, the configuration for radar waveform reporting may indicate that the device is to report a single map for one or more antennas. In some cases, the device may aggregate multiple maps (e.g., multiple maps of one or more antennas) into a single aggregated map when the configuration for radar waveform reporting indicates that the device is to report a single map. The device may then report the single aggregated map to the network node or base station.

In some examples, the received radar waveform is mapped to a compressed representation of the received radar waveform, where the indication of the one or more parameter values associated with the received radar waveform includes the compressed representation of the received radar waveform. In some cases, the compressed representation of the received radar waveform is determined based on a compression algorithm, or a trained model based on machine learning, or an auto-encoder based channel representation, or a generative adversarial networks based channel representation, or any combination thereof, as configured by the configuration for radar waveform reporting. In some cases, the one or more parameter values include Doppler information, incident angle information, angular velocity information, or range information, or a combination thereof, for at least one of the one or more objects.

Figure 12:
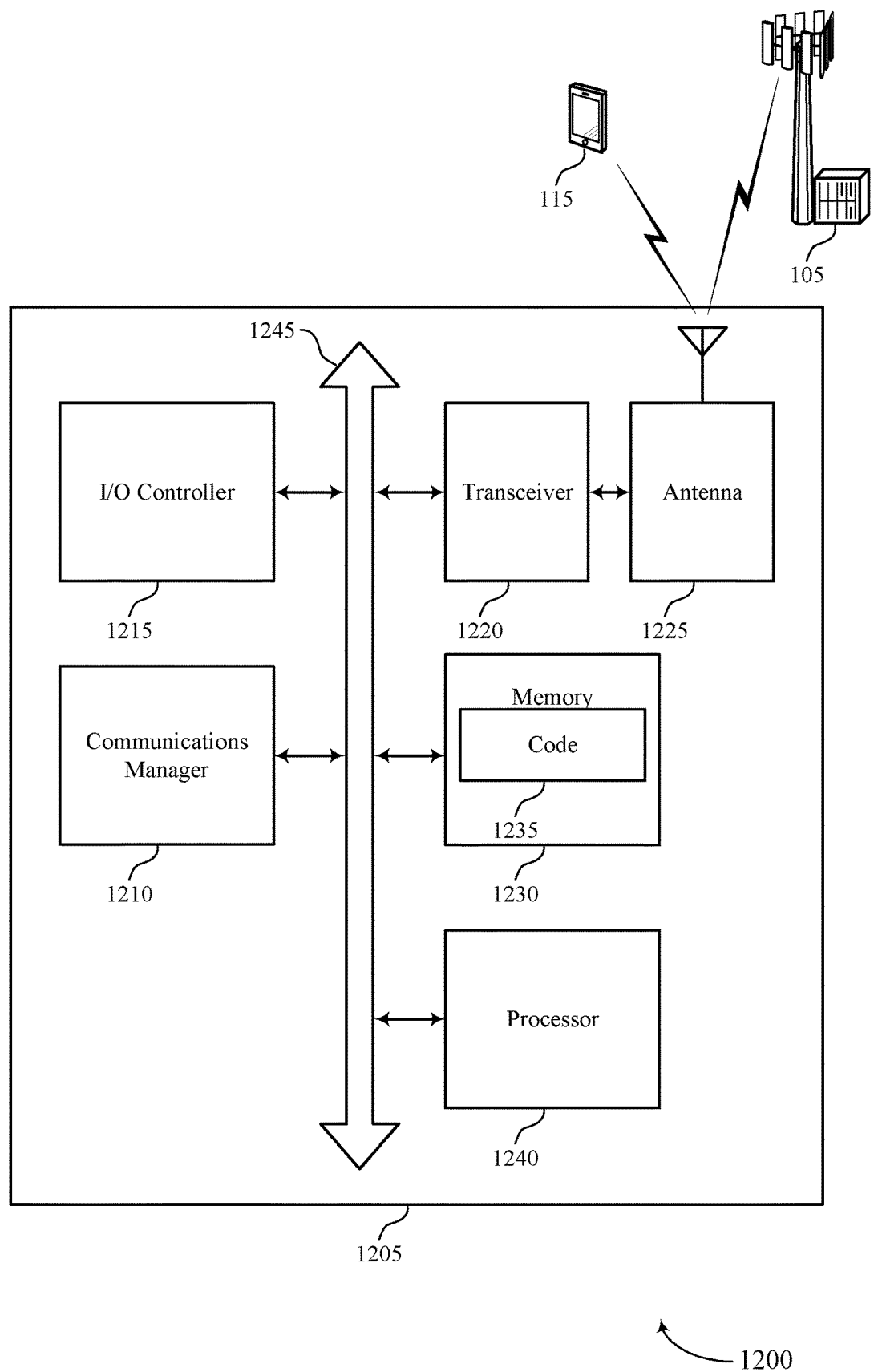
FIG. 12 shows a diagram of a system including a device that supports waveform reporting for cooperative sensing in accordance with aspects of the present disclosure.

FIG. 12 shows a diagram of a system 1200 including a device 1205 that supports waveform reporting for cooperative sensing in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may receive, from a network node, a configuration for radar waveform reporting, the radar waveform reporting for object detection for one or more objects within a detectable range of the UE, receive a radar waveform, and transmit, to the network node according to the received configuration, a radar reporting message including an indication of one or more parameter values associated with the received radar waveform.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas (such as antenna 1225), wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions (such as code 1235) stored in a memory (e.g., the memory 1230) to cause the device 1205 to perform various functions (e.g., functions or tasks supporting waveform reporting for cooperative sensing).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
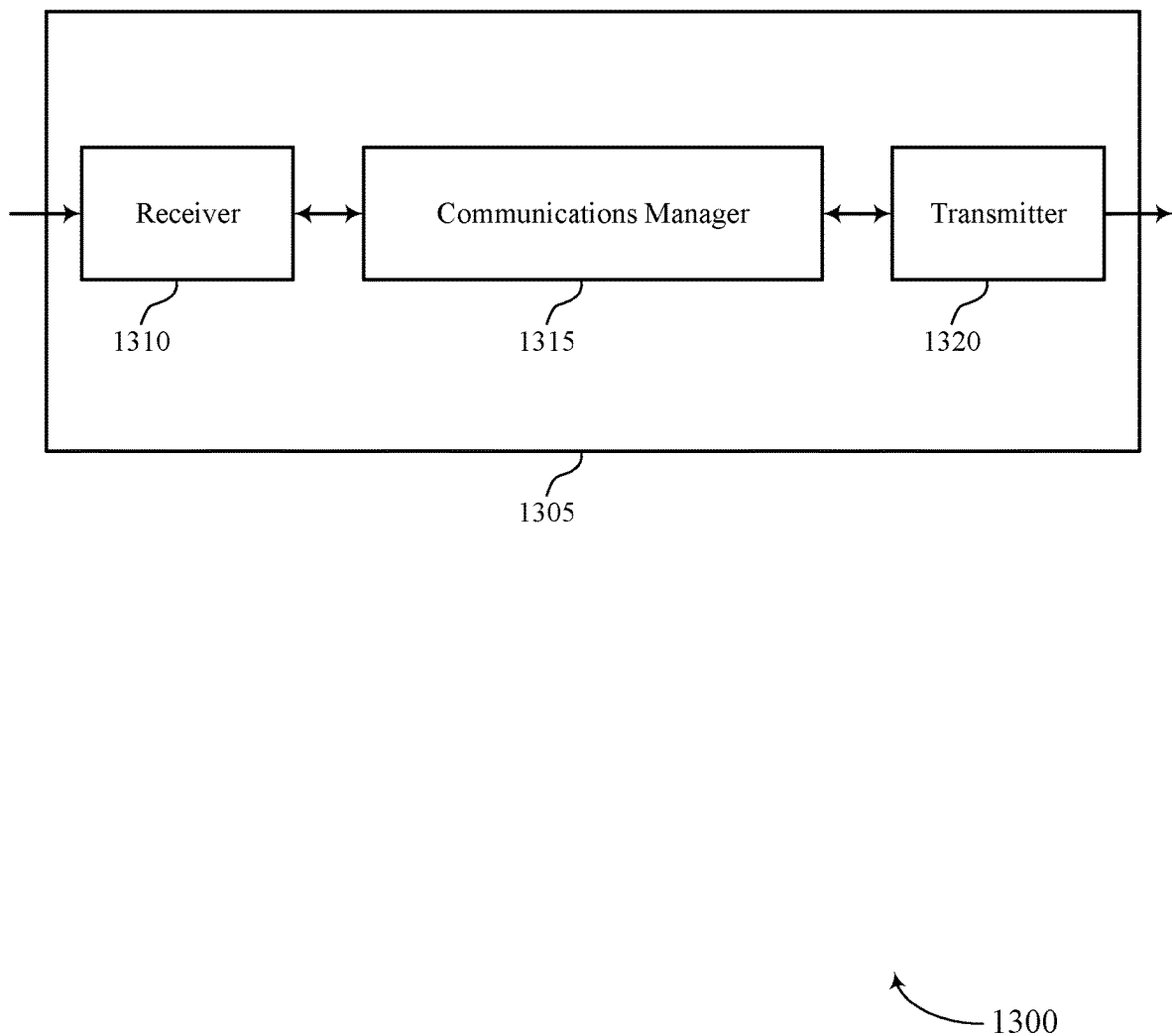
FIGS. 13 and 14 show block diagrams of devices that support waveform reporting for cooperative sensing in accordance with aspects of the present disclosure.

FIG. 13 shows a block diagram 1300 of a device 1305 that supports waveform reporting for cooperative sensing in accordance with aspects of the present disclosure. The device 1305 may be an example of aspects of a base station 105 as described herein. The device 1305 may include a receiver 1310, a communications manager 1315, and a transmitter 1320. The device 1305 may also include a processor (not shown). Each of these components may be in communication with one another (e.g., via one or more buses).

The receiver 1310 may receive information such as packets, user data, or control information associated with various information channels (e.g., control channels, data channels, and information related to waveform reporting for cooperative sensing, etc.). Information may be passed on to other components of the device 1305. The receiver 1310 may be an example of aspects of the transceiver 1620 described herein with reference to FIG. 16. The receiver 1310 may utilize a single antenna or a set of antennas.

The communications manager 1315 may transmit, to a UE, a configuration for radar waveform reporting, receive, from the UE according to the transmitted configuration, an indication of one or more parameter values associated with a radar waveform received at the UE, and determine location information for one or more objects based on the received indication of the one or more parameter values associated with the received radar waveform. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of its functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described herein with reference to FIG. 16. The transmitter 1320 may utilize a single antenna or a set of antennas.

Figure 14:
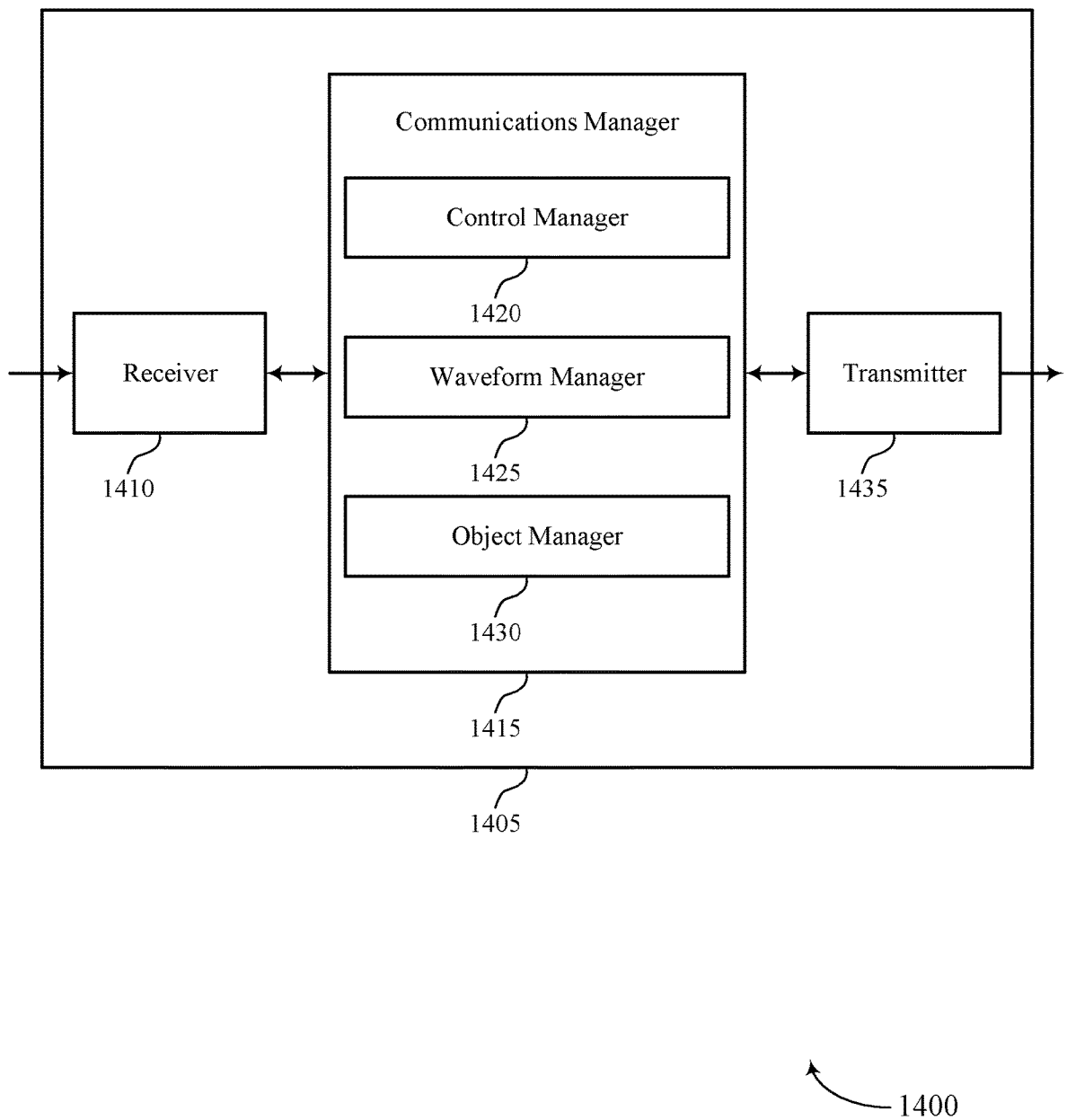

FIG. 14 shows a block diagram 1400 of a device 1405 that supports waveform reporting for cooperative sensing in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor (not shown). Each of these components may be in communication with one another (e.g., via one or more buses).

The receiver 1410 may receive information such as packets, user data, or control information associated with various information channels (e.g., control channels, data channels, and information related to waveform reporting for cooperative sensing, etc.). Information may be passed on to other components of the device 1405. The receiver 1410 may be an example of aspects of the transceiver 1620 described herein with reference to FIG. 16. The receiver 1410 may utilize a single antenna or a set of antennas.

The communications manager 1415 may be an example of aspects of the communications manager 1315 as described herein. The communications manager 1415 may include a control manager 1420, a waveform manager 1425, and an object manager 1430. The communications manager 1415 may be an example of aspects of the communications manager 1610 described herein.

The control manager 1420 may transmit, to a UE, a configuration for radar waveform reporting. The waveform manager 1425 may receive, from the UE according to the transmitted configuration, an indication of one or more parameter values associated with a radar waveform received at the UE. The object manager 1430 may determine location information for one or more objects based on the received indication of the one or more parameter values associated with the received radar waveform.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described herein with reference to FIG. 16. The transmitter 1435 may utilize a single antenna or a set of antennas.

Figure 15:
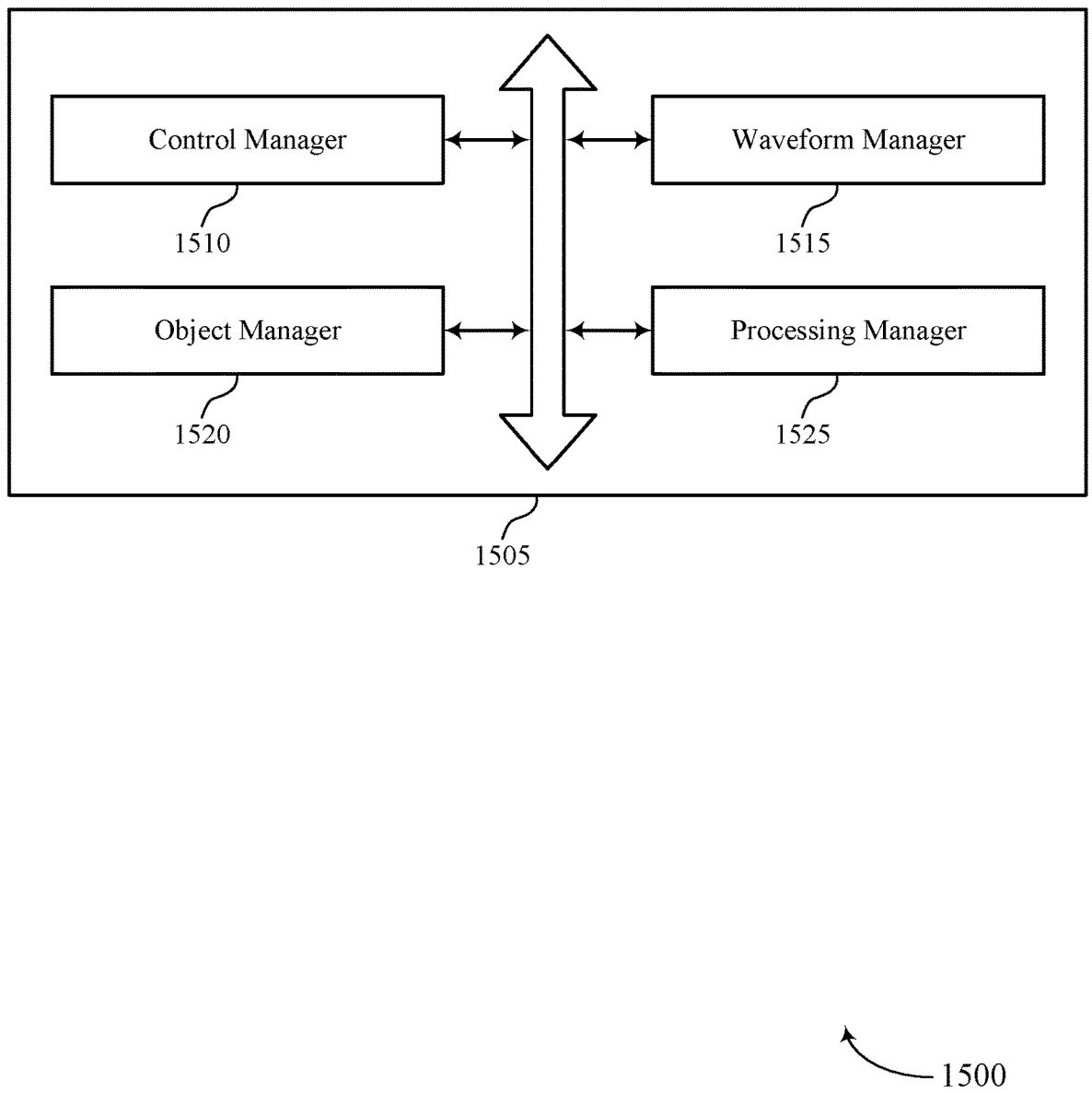
FIG. 15 shows a block diagram of a communications manager that supports waveform reporting for cooperative sensing in accordance with aspects of the present disclosure.

FIG. 15 shows a block diagram 1500 of a communications manager 1505 that supports waveform reporting for cooperative sensing in accordance with aspects of the present disclosure. The communications manager 1505 may be an example of aspects of a communications manager 1315, a communications manager 1415, or a communications manager 1610 described herein. The communications manager 1505 may include a control manager 1510, a waveform manager 1515, an object manager 1520, and a processing manager 1525. Each of these modules may communicate, directly or indirectly, with one another (e.g., via one or more buses).

The control manager 1510 may transmit, to a UE, a configuration for radar waveform reporting. In some examples, the control manager 1510 may generate a map based on the one or more parameter values indicated by the received indication from the UE, where the map includes a range-Doppler map and the one or more parameter values include range information and Doppler information; or the map includes an angle-angular velocity map and the one or more parameter values include incident angle information and angular velocity information; or the map includes a velocity-range map and the one or more parameter values include velocity information and the range information; or any combination thereof.

In some examples, the control manager 1510 may determine the location information of at least one of the one or more objects based on the generated map. In some cases, the map includes an angle-angular velocity map and the one or more parameter values include incident angle information and angular velocity information.

In some cases, the map includes a velocity-range map and the one or more parameter values include velocity information and the range information. In some cases, the one or more parameter values associated with the received radar waveform include chirp information, or range information of at least one of the one or more objects, or Doppler information of at least one of the one or more objects, or velocity information of at least one of the one or more objects, or incident angle information of the received radar waveform based on multiple antennas of the UE receiving the radar waveform, or any combination thereof. In some cases, the network node includes a sensing management function (SMF) or is a base station that includes the sensing management function.

The waveform manager 1515 may receive, from the UE according to the transmitted configuration, an indication of one or more parameter values associated with a radar waveform received at the UE. The object manager 1520 may determine location information for one or more objects based on the received indication of the one or more parameter values associated with the received radar waveform. The processing manager 1525 may decompress the compressed representation of the received radar waveform and the decompression may be determined based on a decompression algorithm, or a trained model based on machine learning, or an auto-encoder based channel representation, or a generative adversarial networks based channel representation, or any combination thereof.

In some cases, the received indication of the one or more parameter values associated with the received radar waveform includes a compressed representation of the received radar waveform.

Figure 16:
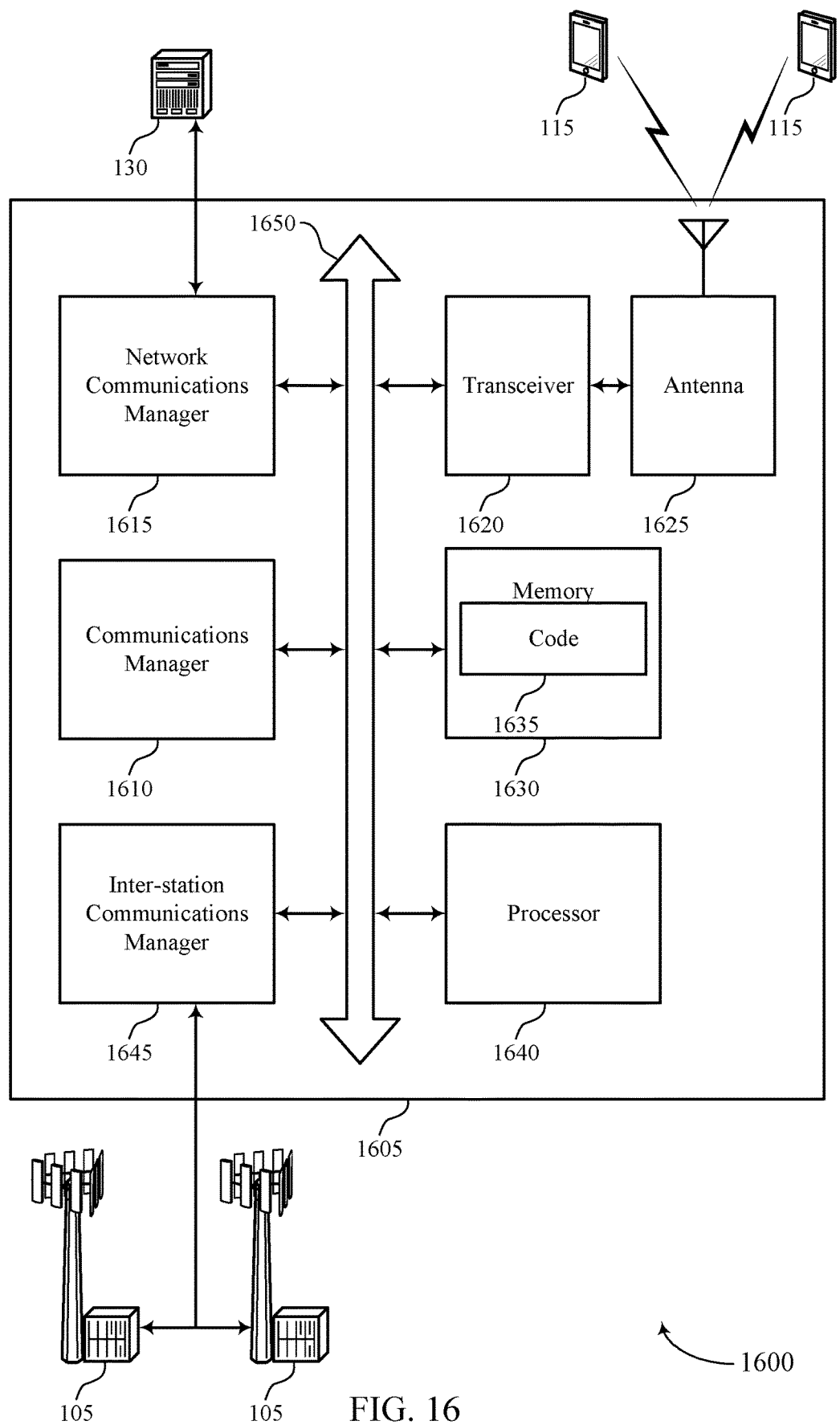
FIG. 16 shows a diagram of a system including a device that supports waveform reporting for cooperative sensing in accordance with aspects of the present disclosure.

FIG. 16 shows a diagram of a system 1600 including a device 1605 that supports waveform reporting for cooperative sensing in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication with each other via one or more buses (e.g., bus 1650).

The communications manager 1610 may transmit, to a UE, a configuration for radar waveform reporting, receive, from the UE according to the transmitted configuration, an indication of one or more parameter values associated with a radar waveform received at the UE, and determine location information for one or more objects based on the received indication of the one or more parameter values associated with the received radar waveform.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas (such as antenna 1625), wired, or wireless links as described herein. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting waveform reporting for cooperative sensing).

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
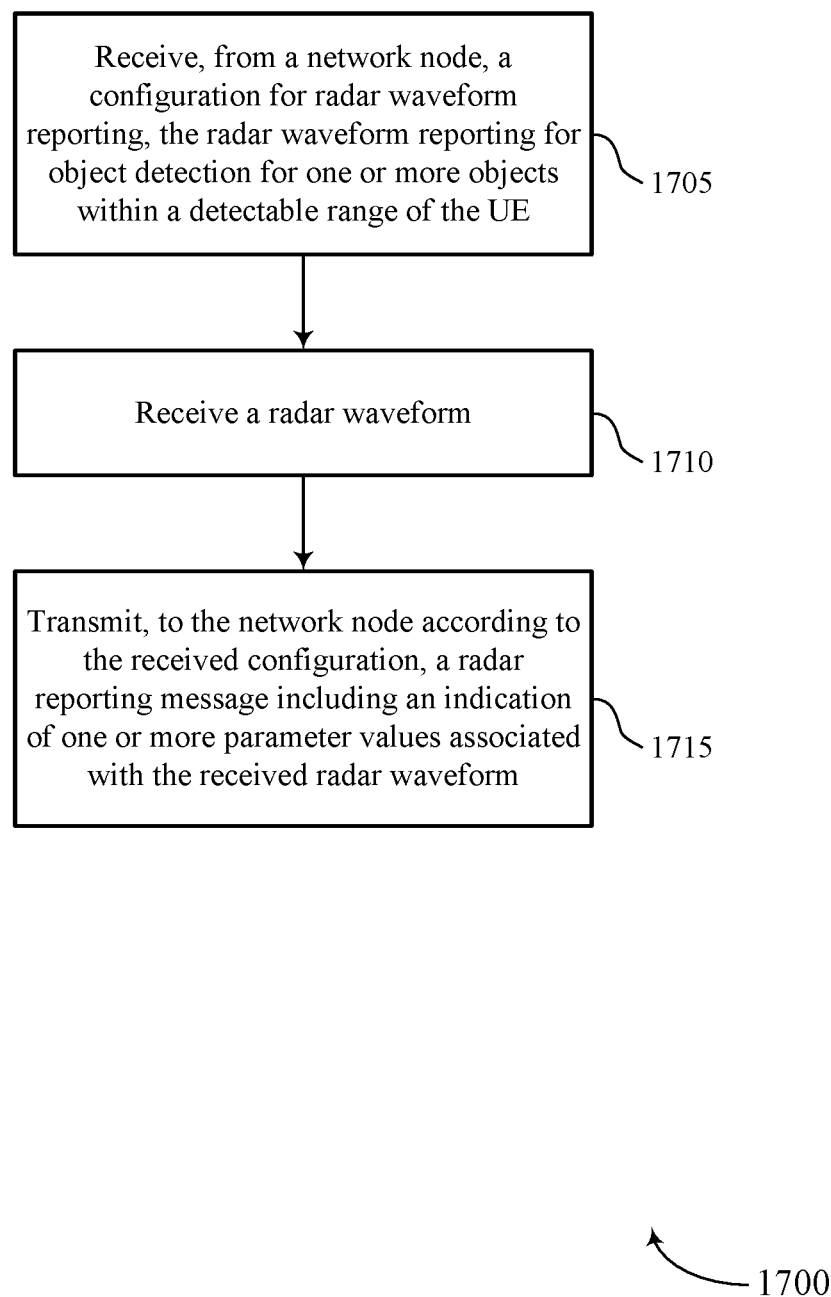
FIGS. 17 through 20 show flowcharts illustrating methods that support waveform reporting for cooperative sensing in accordance with aspects of the present disclosure.

FIG. 17 shows a flowchart illustrating a method 1700 that supports waveform reporting for cooperative sensing in accordance with aspects of the present disclosure. The operations of method 1700 may be implemented by a UE 115 or its components as described herein. For example, the operations of method 1700 may be performed by a communications manager as described herein with reference to FIGS. 9 through 12. In some examples, a UE may execute a set of instructions to control the functional elements of the UE to perform the functions described herein. Additionally, or alternatively, a UE may perform aspects of the functions described herein using special-purpose hardware.

At 1705, the UE may receive, from a network node, a configuration for radar waveform reporting, the radar waveform reporting for object detection for one or more objects within a detectable range of the UE. The operations of 1705 may be performed according to the methods described herein. In some examples, aspects of the operations of 1705 may be performed by a configuration manager as described herein with reference to FIGS. 9 through 12.

At 1710, the UE may receive a radar waveform. The operations of 1710 may be performed according to the methods described herein. In some examples, aspects of the operations of 1710 may be performed by a radar manager as described herein with reference to FIGS. 9 through 12.

At 1715, the UE may transmit, to the network node according to the received configuration, a radar reporting message including an indication of one or more parameter values associated with the received radar waveform. The operations of 1715 may be performed according to the methods described herein. In some examples, aspects of the operations of 1715 may be performed by a reporting manager as described herein with reference to FIGS. 9 through 12.

Figure 18:
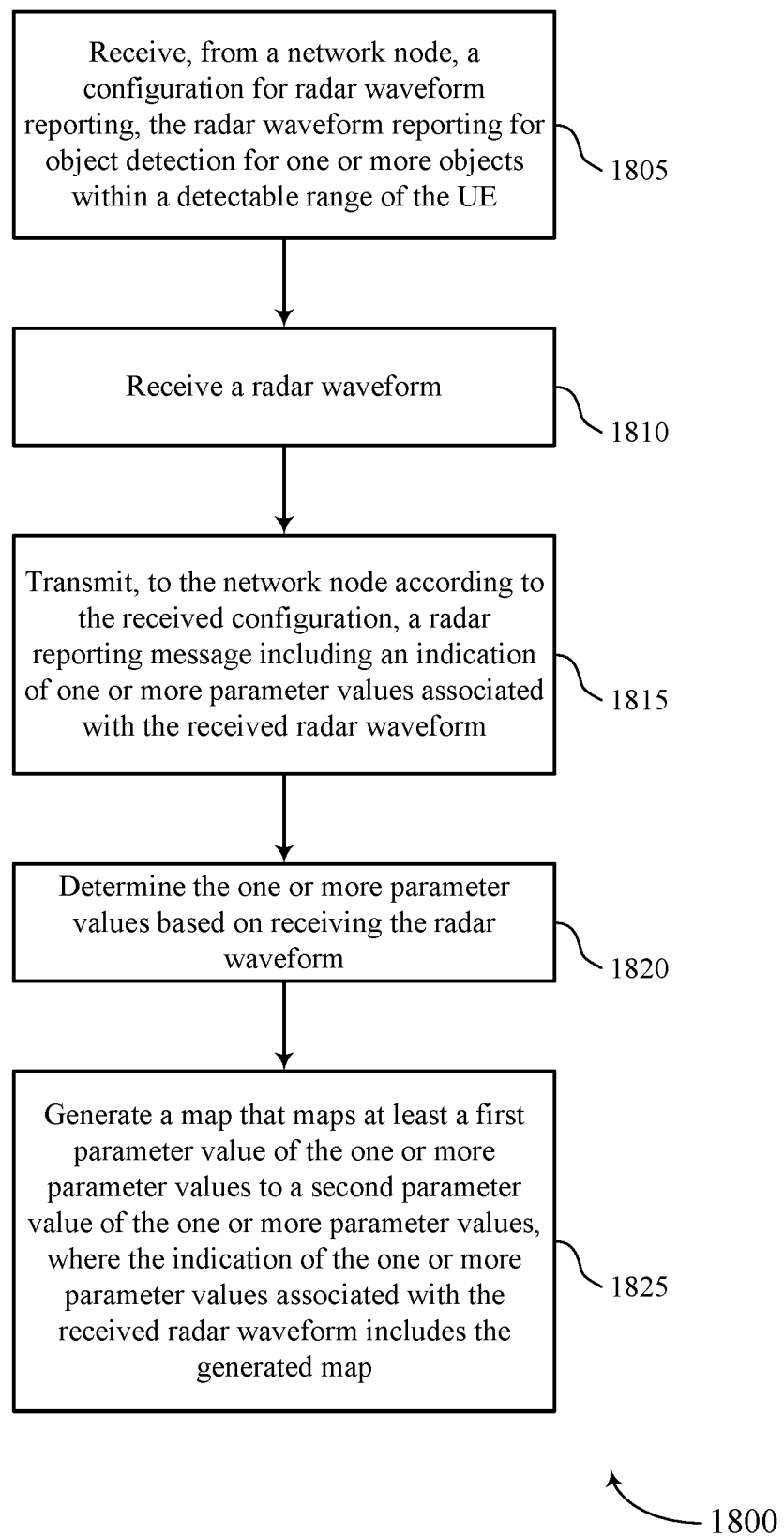

FIG. 18 shows a flowchart illustrating a method 1800 that supports waveform reporting for cooperative sensing in accordance with aspects of the present disclosure. The operations of method 1800 may be implemented by a UE 115 or its components as described herein. For example, the operations of method 1800 may be performed by a communications manager as described herein with reference to FIGS. 9 through 12. In some examples, a UE may execute a set of instructions to control the functional elements of the UE to perform the functions described herein. Additionally, or alternatively, a UE may perform aspects of the functions described herein using special-purpose hardware.

At 1805, the UE may receive, from a network node, a configuration for radar waveform reporting, the radar waveform reporting for object detection for one or more objects within a detectable range of the UE. The operations of 1805 may be performed according to the methods described herein. In some examples, aspects of the operations of 1805 may be performed by a configuration manager as described herein with reference to FIGS. 9 through 12.

At 1810, the UE may receive a radar waveform. The operations of 1810 may be performed according to the methods described herein. In some examples, aspects of the operations of 1810 may be performed by a radar manager as described herein with reference to FIGS. 9 through 12.

At 1815, the UE may transmit, to the network node according to the received configuration, a radar reporting message including an indication of one or more parameter values associated with the received radar waveform. The operations of 1815 may be performed according to the methods described herein. In some examples, aspects of the operations of 1815 may be performed by a reporting manager as described herein with reference to FIGS. 9 through 12.

At 1820, the UE may determine the one or more parameter values based on receiving the radar waveform. The operations of 1820 may be performed according to the methods described herein. In some examples, aspects of the operations of 1820 may be performed by a mapping manager as described herein with reference to FIGS. 9 through 12.

At 1825, the UE may generate a map that maps at least a first parameter value of the one or more parameter values to a second parameter value of the one or more parameter values, where the indication of the one or more parameter values associated with the received radar waveform includes the generated map. The operations of 1825 may be performed according to the methods described herein. In some examples, aspects of the operations of 1825 may be performed by a mapping manager as described herein with reference to FIGS. 9 through 12.

Figure 19:
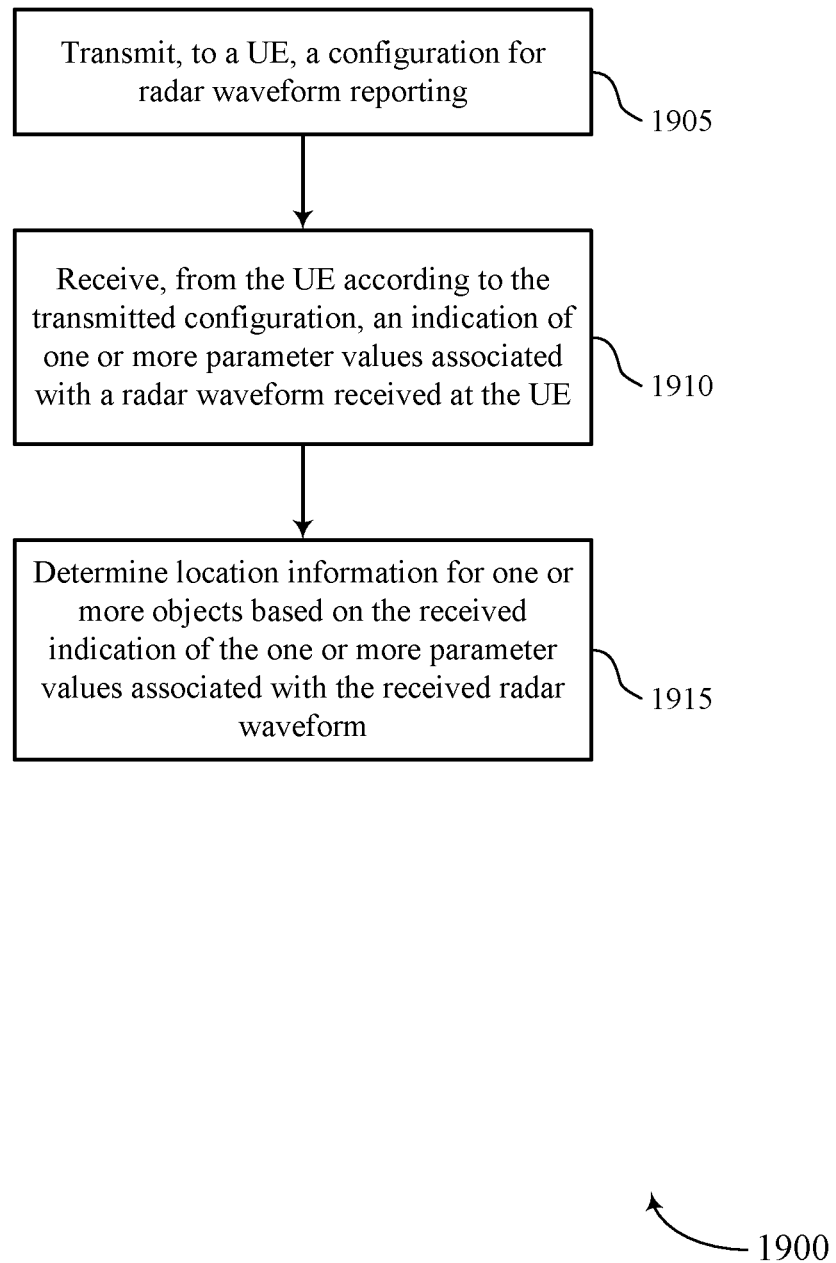

FIG. 19 shows a flowchart illustrating a method 1900 that supports waveform reporting for cooperative sensing in accordance with aspects of the present disclosure. The operations of method 1900 may be implemented by a base station 105 or its components as described herein. For example, the operations of method 1900 may be performed by a communications manager as described herein with reference to FIGS. 13 through 16. In some examples, a base station may execute a set of instructions to control the functional elements of the base station to perform the functions described herein. Additionally, or alternatively, a base station may perform aspects of the functions described herein using special-purpose hardware.

At 1905, the base station may transmit, to a UE, a configuration for radar waveform reporting. The operations of 1905 may be performed according to the methods described herein. In some examples, aspects of the operations of 1905 may be performed by a control manager as described herein with reference to FIGS. 13 through 16.

At 1910, the base station may receive, from the UE according to the transmitted configuration, an indication of one or more parameter values associated with a radar waveform received at the UE. The operations of 1910 may be performed according to the methods described herein. In some examples, aspects of the operations of 1910 may be performed by a waveform manager as described herein with reference to FIGS. 13 through 16.

At 1915, the base station may determine location information for one or more objects based on the received indication of the one or more parameter values associated with the received radar waveform. The operations of 1915 may be performed according to the methods described herein. In some examples, aspects of the operations of 1915 may be performed by an object manager as described herein with reference to FIGS. 13 through 16.

Figure 20:
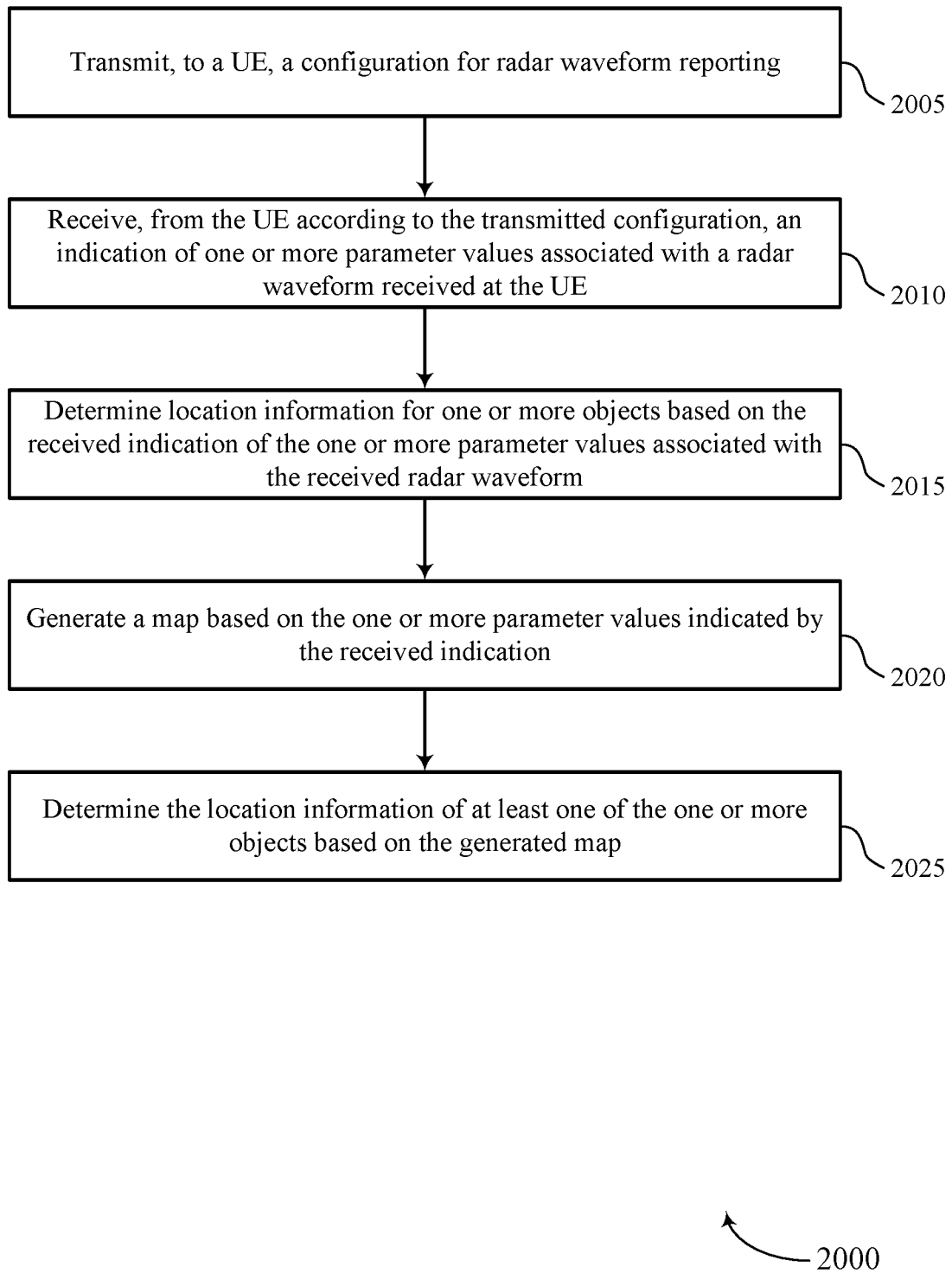

FIG. 20 shows a flowchart illustrating a method 2000 that supports waveform reporting for cooperative sensing in accordance with aspects of the present disclosure. The operations of method 2000 may be implemented by a base station 105 or its components as described herein. For example, the operations of method 2000 may be performed by a communications manager as described herein with reference to FIGS. 13 through 16. In some examples, a base station may execute a set of instructions to control the functional elements of the base station to perform the functions described herein. Additionally, or alternatively, a base station may perform aspects of the functions described herein using special-purpose hardware.

At 2005, the base station may transmit, to a UE, a configuration for radar waveform reporting. The operations of 2005 may be performed according to the methods described herein. In some examples, aspects of the operations of 2005 may be performed by a control manager as described herein with reference to FIGS. 13 through 16.

At 2010, the base station may receive, from the UE according to the transmitted configuration, an indication of one or more parameter values associated with a radar waveform received at the UE. The operations of 2010 may be performed according to the methods described herein. In some examples, aspects of the operations of 2010 may be performed by a waveform manager as described herein with reference to FIGS. 13 through 16.

At 2015, the base station may determine location information for one or more objects based on the received indication of the one or more parameter values associated with the received radar waveform. The operations of 2015 may be performed according to the methods described herein. In some examples, aspects of the operations of 2015 may be performed by an object manager as described herein with reference to FIGS. 13 through 16.

At 2020, the base station may generate a map based on the one or more parameter values indicated by the received indication, where the map includes a range-Doppler map and the one or more parameter values include range information and Doppler information; or the map includes an angle-angular velocity map and the one or more parameter values include incident angle information and angular velocity information; or the map includes a velocity-range map and the one or more parameter values include velocity information and the range information; or any combination thereof. The operations of 2020 may be performed according to the methods described herein. In some examples, aspects of the operations of 2020 may be performed by a control manager as described herein with reference to FIGS. 13 through 16.

At 2025, the base station may determine the location information of at least one of the one or more objects based on the generated map. The operations of 2025 may be performed according to the methods described herein. In some examples, aspects of the operations of 2025 may be performed by a control manager as described herein with reference to FIGS. 13 through 16.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication a UE, comprising: receiving, from a network node, a configuration for radar waveform reporting, the radar waveform reporting for object detection for one or more objects within a detectable range of the UE; receiving a radar waveform; and transmitting, to the network node according to the received configuration, a radar reporting message comprising an indication of one or more parameter values associated with the received radar waveform.

Aspect 2: The method of aspect 1, further comprising: determining the one or more parameter values based at least in part on receiving the radar waveform; and generating a map that maps at least a first parameter value of the one or more parameter values to a second parameter value of the one or more parameter values, wherein the indication of the one or more parameter values associated with the received radar waveform comprises the generated map.

Aspect 3: The method of aspect 2, wherein the one or more parameter values comprise Doppler information, incident angle information, or angular velocity information, or range information, or a combination thereof, for at least one of the one or more objects.

Aspect 4: The method of aspect 3, wherein generating the map comprises: performing a row-wise operation on a first grid that includes subcarrier rows and symbol columns to compute values for Doppler columns; and performing a column-wise operation on a second grid that includes the subcarrier rows and the computed Doppler columns to compute range row values for the map, wherein the first parameter value comprises the range information and the second parameter value comprises the Doppler information, and the map comprises a range-Doppler map.

Aspect 5: The method of any of aspects 3 through 4, wherein generating the velocity-range map comprises: performing a row-wise operation on a first grid that includes chirp rows and sample columns to compute values for range columns; and performing a column-wise operation on a second grid that includes the chirp rows and the computed range columns to compute velocity row values for the map, wherein the first parameter value comprises the velocity information and the second parameter value comprises the range information, and the map comprises a velocity-range map.

Aspect 6: The method of any of aspects 2 through 5, wherein generating the map comprises: generating, based at least in part on the configuration for radar waveform reporting, an antenna-specific map for each antenna of multiple antennas of the UE that receives the radar waveform.

Aspect 7: The method of any of aspects 2 through 6, wherein generating the map comprises: generating, based at least in part on the configuration for radar waveform reporting, an antenna-aggregate map for one or more antennas of the UE that receives the radar waveform.

Aspect 8: The method of any of aspects 1 through 7, further comprising: mapping the received radar waveform to a compressed representation of the received radar waveform, wherein the indication of the one or more parameter values associated with the received radar waveform comprises the compressed representation of the received radar waveform.

Aspect 9: The method of aspect 8, wherein the compressed representation of the received radar waveform is determined based on a compression algorithm, or a trained model based on machine learning, or an auto-encoder based channel representation, or a generative adversarial networks based channel representation, or any combination thereof, as configured by the configuration for radar waveform reporting.

Aspect 10: The method of any of aspects 1 through 9, wherein the one or more parameter values associated with the received radar waveform comprise one or more time-domain samples of the received radar waveform obtained by the UE at a configured sampling rate.

Aspect 11: The method of any of aspects 1 through 10, wherein the one or more parameter values associated with the received radar waveform comprise one or more frequency-domain samples of the received radar waveform obtained by the UE at a configured sampling rate.

Aspect 12: The method of aspect 11, wherein the one or more frequency-domain samples comprise each symbol and tone of the received radar waveform.

Aspect 13: The method of any of aspects 1 through 12, wherein receiving the radar waveform comprises receiving a reflected transmission of the radar waveform when the UE transmits the radar waveform, or receiving the reflected transmission of the radar waveform and receiving a direct transmission of the radar waveform when another UE, the network node, or a second network node transmits the radar waveform.

Aspect 14: The method of aspect 13, further comprising: performing synchronization with the network node; and determining a start time for transmission of the radar waveform based at least in part on the performed synchronization.

Aspect 15: The method of aspect 14, further comprising: determining a direct time of flight of the direct transmission of the radar waveform based at least in part on the determined start time and a direct arrival time of the direct transmission; or determining a reflected time of flight of the reflected transmission of the radar waveform based at least in part on the determined start time and a reflected arrival time of the reflected transmission; or determining a differential time of flight based at least in part on a difference of the reflected arrival time of the reflected transmission and the direct arrival time of the direct transmission; or any combination thereof.

Aspect 16: The method of any of aspects 14 through 15, where the synchronization uses GPS signals from a satellite or synchronization signal blocks (SSBs) from the network node.

Aspect 17: The method of any of aspects 1 through 16, wherein the configuration for radar waveform reporting comprises one or more fast Fourier transform dimensions and configures the UE to report parameters that satisfy a configured parameter criteria, and the one or more parameter values associated with the received radar waveform comprise the parameters.

Aspect 18: The method of any of aspects 1 through 17, wherein the radar waveform comprises an orthogonal frequency-division multiplexing waveform, or a discrete Fourier transform spreading waveform, or a single carrier waveform, or a frequency-modulated continuous-wave waveform, or any combination thereof.

Aspect 19: A method for wireless communication at a network node, comprising: transmitting, to a UE, a configuration for radar waveform reporting; receiving, from the UE according to the transmitted configuration, an indication of one or more parameter values associated with a radar waveform received at the UE; and determining location information for one or more objects based at least in part on the received indication of the one or more parameter values associated with the received radar waveform.

Aspect 20: The method of aspect 19, comprising: generating a map based at least in part on the one or more parameter values indicated by the received indication, wherein: the map comprises a range-Doppler map and the one or more parameter values comprise range information and Doppler information; or the map comprises an angle-angular velocity map and the one or more parameter values comprise incident angle information and angular velocity information; or the map comprises a velocity-range map and the one or more parameter values comprise velocity information and the range information; or any combination thereof and determining the location information of at least one of the one or more objects based at least in part on the generated map.

Aspect 21: The method of any of aspects 19 through 20, wherein the one or more parameter values associated with the received radar waveform comprise chirp information, or range information of at least one of the one or more objects, or Doppler information of at least one of the one or more objects, or velocity information of at least one of the one or more objects, or incident angle information of the received radar waveform based at least in part on multiple antennas of the UE receiving the radar waveform, or any combination thereof.

Aspect 22: The method of any of aspects 19 through 21, wherein the received indication of the one or more parameter values associated with the received radar waveform comprises a compressed representation of the received radar waveform.

Aspect 23: The method of aspect 22, wherein decompressing the compressed representation of the received radar waveform is determined based on a decompression algorithm, or a trained model based on machine learning, or an auto-encoder based channel representation, or a generative adversarial networks based channel representation, or any combination thereof.

Aspect 24: The method of any of aspects 19 through 23, wherein the network node comprises a sensing management function or is a base station that comprises the sensing management function.

Aspect 25: An apparatus for wireless communication a UE, comprising a processor; memory coupled with the processor; and instructions stored in the memory and executable by the processor to cause the apparatus to perform a method of any of aspects 1 through 18.

Aspect 26: An apparatus for wireless communication a UE, comprising at least one means for performing a method of any of aspects 1 through 18.

Aspect 27: A non-transitory computer-readable medium storing code for wireless communication a UE, the code comprising instructions executable by a processor to perform a method of any of aspects 1 through 18.

Aspect 28: An apparatus for wireless communication at a network node, comprising a processor; memory coupled with the processor; and instructions stored in the memory and executable by the processor to cause the apparatus to perform a method of any of aspects 19 through 24.

Aspect 29: An apparatus for wireless communication at a network node, comprising at least one means for performing a method of any of aspects 19 through 24.

Aspect 30: A non-transitory computer-readable medium storing code for wireless communication at a network node, the code comprising instructions executable by a processor to perform a method of any of aspects 19 through 24.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication a user equipment (UE), comprising:
   receiving, from a network node, a configuration for radar waveform reporting, the radar waveform reporting for object detection for one or more objects within a detectable range of the UE, wherein the configuration for radar waveform reporting indicates one or more parameters associated with radar waveforms;

receiving a radar waveform; and transmitting, to the network node according to the received configuration for radar waveform reporting, a radar reporting message comprising an indication of one or more parameter values associated with the received radar waveform, wherein the one or more parameter values correspond to the indicated one or more parameters.

2. The method of claim 1, further comprising:

determining the one or more parameter values based at least in part on receiving the radar waveform; and generating a map that maps at least a first parameter value of the one or more parameter values to a second parameter value of the one or more parameter values, wherein the indication of the one or more parameter values associated with the received radar waveform comprises the generated map.

3. The method of claim 2, wherein the one or more parameter values comprise Doppler information, incident angle information, angular velocity information, or range information, or any combination thereof, for at least one of the one or more objects.

4. The method of claim 3, wherein generating the map comprises:

performing a row-wise operation on a first grid that includes subcarrier rows and symbol columns to compute values for Doppler columns; and performing a column-wise operation on a second grid that includes the subcarrier rows and the computed Doppler columns to compute range row values for the map, wherein the first parameter value comprises the range information and the second parameter value comprises the Doppler information, and the map comprises a range-Doppler map.

5. The method of claim 3, wherein generating the map comprises:

performing a row-wise operation on a first grid that includes chirp rows and sample columns to compute values for range columns; and performing a column-wise operation on a second grid that includes the chirp rows and the computed range columns to compute velocity row values for the map, wherein the first parameter value comprises the velocity information and the second parameter value comprises the range information, and the map comprises a velocity-range map.

6. The method of claim 2, wherein generating the map comprises:

generating, based at least in part on the configuration for radar waveform reporting, an antenna-specific map for each antenna of multiple antennas of the UE that receives the radar waveform.

7. The method of claim 2, wherein generating the map comprises:

generating, based at least in part on the configuration for radar waveform reporting, an antenna-aggregate map for one or more antennas of the UE that receives the radar waveform.

8. The method of claim 1, further comprising:

mapping the received radar waveform to a compressed representation of the received radar waveform, wherein the indication of the one or more parameter values associated with the received radar waveform comprises the compressed representation of the received radar waveform.

9. The method of claim 8, wherein the compressed representation of the received radar waveform is determined based at least in part on a compression algorithm, or a trained model based on machine learning, or an autoencoder based channel representation, or a generative adversarial networks based channel representation, or any combination thereof, as configured by the configuration for radar waveform reporting.

10. The method of claim 1, wherein the one or more parameter values associated with the received radar waveform comprise one or more time-domain samples of 3 the received radar waveform obtained by the UE at a configured sampling rate.

11. The method of claim 1, wherein the one or more parameter values associated with the received radar waveform comprise one or more frequency-domain samples of the received radar waveform obtained by the UE at a configured sampling rate.

12. The method of claim 11, wherein the one or more frequency-domain samples comprise each symbol and tone of the received radar waveform.

13. The method of claim 1, wherein:

receiving the radar waveform comprises receiving a reflected transmission of the radar waveform when the UE transmits the radar waveform, or receiving the reflected transmission of the radar waveform and receiving a direct transmission of the radar waveform when another UE, the network node, or a second network node transmits the radar waveform.

14. The method of claim 13, further comprising:

performing synchronization with the network node; and determining a start time for transmission of the radar waveform based at least in part on the performed synchronization.

15. The method of claim 14, further comprising:

determining a direct time of flight of the direct transmission of the radar waveform based at least in part on the determined start time and a direct arrival time of the direct transmission; or determining a reflected time of flight of the reflected transmission of the radar waveform based at least in part on the determined start time and a reflected arrival time of the reflected transmission; or determining a differential time of flight based at least in part on a difference of the reflected arrival time of the reflected transmission and the direct arrival time of the direct transmission; or any combination thereof.

16. The method of claim 14, where the synchronization uses global positioning system (GPS) signals from a satellite or synchronization signal blocks (SSBs) from the network node.

17. The method of claim 1, wherein the configuration for radar waveform reporting comprises one or more fast Fourier transform dimensions and configures the UE to report parameters that satisfy a configured parameter criteria, and wherein the one or more parameter values associated with the received radar waveform comprise the parameters.

18. The method of claim 1, wherein the radar waveform comprises an orthogonal frequency-division multiplexing waveform, or a discrete Fourier transform spreading waveform, or a single carrier waveform, or a frequency-modulated continuous-wave waveform, or any combination thereof.

19. A method for wireless communication at a network node, comprising:
   transmitting, to a user equipment (UE), a configuration for radar waveform reporting, wherein the configuration for radar waveform reporting indicates one or more parameters associated with radar waveforms;
   receiving, from the UE according to the transmitted configuration for radar waveform reporting, an indication of one or more parameter values associated with a radar waveform received at the UE, wherein the one or more parameter values correspond to the indicated one or more parameters; and
   determining location information for one or more objects based at least in part on the received indication of the one or more parameter values associated with the received radar waveform.

20. The method of claim 19, comprising:
   generating a map based at least in part on the one or more parameter values indicated by the received indication, wherein:
      the map comprises a range-Doppler map and the one or more parameter values comprise range information and Doppler information; or
      the map comprises an angle-angular velocity map and the one or more parameter values comprise incident angle information and angular velocity information; or
      the map comprises a velocity-range map and the one or more parameter values comprise velocity information and the range information; or
      any combination thereof; and
   determining the location information of at least one of the one or more objects based at least in part on the generated map.

21. The method of claim 19, wherein the one or more parameter values associated with the received radar waveform comprise chirp information, or range information of at least one of the one or more objects, or Doppler information of at least one of the one or more objects, or velocity information of at least one of the one or more objects, or incident angle information of the received radar waveform based at least in part on multiple antennas of the UE receiving the radar waveform, or any combination thereof.

22. The method of claim 19, wherein the received indication of the one or more parameter values associated with the received radar waveform comprises a compressed representation of the received radar waveform.

23. The method of claim 22, wherein decompressing the compressed representation of the received radar waveform is determined based on a decompression algorithm, or a trained model based on machine learning, or an autoencoder based channel representation, or a generative adversarial networks based channel representation, or any combination thereof.

24. The method of claim 19, wherein the network node comprises a sensing management function or is a base station that comprises the sensing management function.

25. An apparatus for wireless communication at a user equipment (UE), comprising:
   at least one processor; and
   at least one memory coupled with the at least one processor, with instructions stored in the at least one memory, the instructions being executable by the at least one processor, individually or in any combination, to cause the apparatus to:
      receive, from a network node, a configuration for radar waveform reporting, the radar waveform reporting for object detection for one or more objects within a detectable range of the UE, wherein the configuration for radar waveform reporting indicates one or more parameters associated with radar waveforms;
      receive a radar waveform; and
      transmit, to the network node according to the received configuration for radar waveform reporting, a radar reporting message comprising an indication of one or more parameter values associated with the received radar waveform, wherein the one or more parameter values correspond to the indicated one or more parameters.

26. The apparatus of claim 25, wherein the instructions are further executable by the at least one processor to cause the apparatus to:
   determine the one or more parameter values based at least in part on receiving the radar waveform; and
   generate a map that maps at least a first parameter value of the one or more parameter values to a second parameter value of the one or more parameter values, wherein the indication of the one or more parameter values associated with the received radar waveform comprises the generated map.

27. The apparatus of claim 26, wherein the one or more parameter values comprise Doppler information, incident angle information, angular velocity information, or range information, or any combination thereof, for at least one of the one or more objects.

28. The apparatus of claim 27, wherein the instructions to generate the map are executable by the at least one processor to cause the apparatus to:
   perform a row-wise operation on a first grid that includes subcarrier rows and symbol columns to compute values for Doppler columns; and
   perform a column-wise operation on a second grid that includes the subcarrier rows and the computed Doppler columns to compute range row values for the map, wherein the first parameter value comprises the range information and the second parameter value comprises the Doppler information, and the map comprises a range-Doppler map.

29. The apparatus of claim 27, wherein the instructions to generate the map are executable by the at least one processor to cause the apparatus to:
   perform a row-wise operation on a first grid that includes chirp rows and sample columns to compute values for range columns; and
   perform a column-wise operation on a second grid that includes the chirp rows and the computed range columns to compute velocity row values for the map, wherein the first parameter value comprises the velocity information and the second parameter value comprises the range information, and the map comprises a velocity-range map.

30. An apparatus for wireless communication at a network node, comprising:
   at least one processor; and
   at least one memory coupled with the at least one processor, with instructions stored in the at least one memory, the instructions being executable by the at least one processor, individually or in any combination, to cause the apparatus to:
      transmit, to a user equipment (UE), a configuration for radar waveform reporting, wherein the configuration for radar waveform reporting indicates one or more parameters associated with radar waveforms;

receive, from the UE according to the transmitted configuration for radar waveform reporting, an indication of one or more parameter values associated with a radar waveform received at the UE, wherein the one or more parameter values correspond to the indicated one or more parameters; and determine location information for one or more objects based at least in part on the received indication of the one or more parameter values associated with the received radar waveform.

\* \* \* \* \*